(12) United States Patent
Sha et al.

(10) Patent No.: US 12,615,603 B2
(45) Date of Patent: Apr. 28, 2026

(54) METHOD AND APPARATUS FOR RADIO RESOURCE MAPPING AND SCHEDULING

(71) Applicant: ZTE CORPORATION, Shenzhen (CN)

(72) Inventors: Xiubin Sha, Shenzhen (CN); Bo Dai, Shenzhen (CN); Nan Zhang, Shenzhen (CN); Ting Lu, Shenzhen (CN); Li Niu, Shenzhen (CN); Xu Liu, Shenzhen (CN); Jie Tan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 344 days.

(21) Appl. No.: 17/851,074

(22) Filed: Jun. 28, 2022

(65) Prior Publication Data

US 2022/0338146 A1 Oct. 20, 2022

Related U.S. Application Data

(63) Continuation of application No. PCT/CN2020/101249, filed on Jul. 10, 2020.

(51) Int. Cl.
*H04B 7/00* (2006.01)
*H04W 48/10* (2009.01)
*H04W 56/00* (2009.01)

(52) U.S. Cl.
CPC ....... *H04W 56/0015* (2013.01); *H04W 48/10* (2013.01)

(58) Field of Classification Search
None
See application file for complete search history.

(56) References Cited

U.S. PATENT DOCUMENTS

| | | | | |
|---|---|---|---|---|
| 10,136,439 | B2 * | 11/2018 | Son | H04W 72/046 |
| 11,206,167 | B1 * | 12/2021 | Zhang | H04L 27/2657 |
| 11,323,204 | B2 * | 5/2022 | Lyer | H04L 5/0007 |

(Continued)

FOREIGN PATENT DOCUMENTS

| | | |
|---|---|---|
| CN | 106879040 A | 6/2017 |
| CN | 108092930 A | 5/2018 |

(Continued)

OTHER PUBLICATIONS

3GPP: "Email discussion/approval related to sync timing" [100b-e-NR-5G_V2X_NRSL-SYNC-04] www.3gpp.org/ftp/tsg_ran/WGI_RLI/TSGRI_ 1O0b_e/Inbox/drafts/7.2.4.3 Sidelink synchronization mechanism, sl sync thread #04_v5_oppo_ericsson.docx; Apr. 21, 2020 (4 pages).

(Continued)

*Primary Examiner* — Sithu Ko
(74) *Attorney, Agent, or Firm* — Foley & Lardner LLP

(57) ABSTRACT

In some embodiments, a wireless communication method includes receiving, by a wireless communication device from a wireless communication node, a plurality of common signals. The wireless communication node provides a plurality of cell beams. The wireless communication method includes determining, by the wireless communication device, based on respective reception occasions of one or more of the plurality of common signals, an index of one of a plurality of cell beams that the wireless communication device selects.

20 Claims, 20 Drawing Sheets

(56)  References Cited

U.S. PATENT DOCUMENTS

| | | | | |
|---|---|---|---|---|
| 11,700,600 | B2 * | 7/2023 | Park ....................... | H04B 7/088 |
| | | | | 370/329 |
| 11,812,452 | B2 * | 11/2023 | Xu ....................... | H04W 72/046 |
| 2017/0149480 | A1 * | 5/2017 | Kakishima ............. | H04B 7/024 |
| 2019/0223094 | A1 * | 7/2019 | Ingale ................. | H04W 68/005 |
| 2020/0008247 | A1 * | 1/2020 | Kwak .................. | H04B 7/0695 |
| 2020/0053670 | A1 | 2/2020 | Jung et al. | |
| 2020/0112978 | A1 * | 4/2020 | Zhang .................. | H04W 72/21 |
| 2020/0204304 | A1 * | 6/2020 | Liu ........................... | H04B 7/06 |
| 2020/0245269 | A1 * | 7/2020 | Tomeba .............. | H04L 27/0006 |
| 2021/0022096 | A1 * | 1/2021 | Rane ................... | H04W 48/16 |
| 2021/0119697 | A1 * | 4/2021 | Wang ................. | H04B 7/18543 |
| 2021/0195603 | A1 * | 6/2021 | Jiang ................... | H04B 7/0617 |
| 2021/0235456 | A1 * | 7/2021 | Xu ........................... | H04L 5/003 |
| 2021/0345200 | A1 * | 11/2021 | Jang ................. | H04W 36/0079 |
| 2021/0385773 | A1 * | 12/2021 | Ma ....................... | H04B 7/1851 |
| 2022/0116096 | A1 * | 4/2022 | Agiwal ............. | H04W 36/0016 |
| 2022/0167427 | A1 * | 5/2022 | Ko ........................ | H04L 5/0044 |
| 2022/0225432 | A1 * | 7/2022 | Wang ................. | H04W 74/0866 |
| 2023/0327723 | A1 * | 10/2023 | Pan ................... | H04W 56/0015 |
| | | | | 370/329 |

FOREIGN PATENT DOCUMENTS

| | | |
|---|---|---|
| CN | 109479236 A | 3/2019 |
| CN | 111108695 A | 5/2020 |
| WO | WO-2017/083489 A1 | 5/2017 |
| WO | WO-2019/098919 A1 | 5/2019 |
| WO | WO-2020/114276 A1 | 6/2020 |

OTHER PUBLICATIONS

International Search Report and Written Opinion for PCT Appl. No. PCT/CN2020/101249, dated Apr. 12, 2021 (8 pages).

Omri et al.: "Synchronization Procedure in 5G NR Systems" IEEE Access; Apr. 11, 2019 (10 pages).

Zte et al.: "Discussion on synchronization mechanism in NR V2X" 3GPP TSG RAN WG1 #97; R1-1906462; May 17, 2019; Reno, USA (8 pages).

Extended European Search Report for EP Appl. No. 20944218.5 dated Nov. 8, 2022 (8 pages).

Mediatek Inc.: "Physical layer control procedure in NR-NTN," 3GPP TSG RAN WG1 Meeting #99; R1-1912123; Nov. 18-22, 2019; Reno, USA (5 pages).

First Office Action for CN Appl. No. 202080095412.1, dated Jul. 12, 2024 (with English translation, 19 pages).

Second Office Action for CN Appl. No. 202080095412.1, dated Nov. 25, 2024 (with English translation, 22 pages).

Notice of Final Rejection for KR Appl. No. 10-2022-7022313, dated Jun. 29, 2025 (with English translation, 5 pages).

* cited by examiner

SFN subframe: 0 1 2 3 4 5 6 7 8 9

Carrying MIB

80ms/8. e.g. the repetition number in 80ms scheduling periodicity is 8

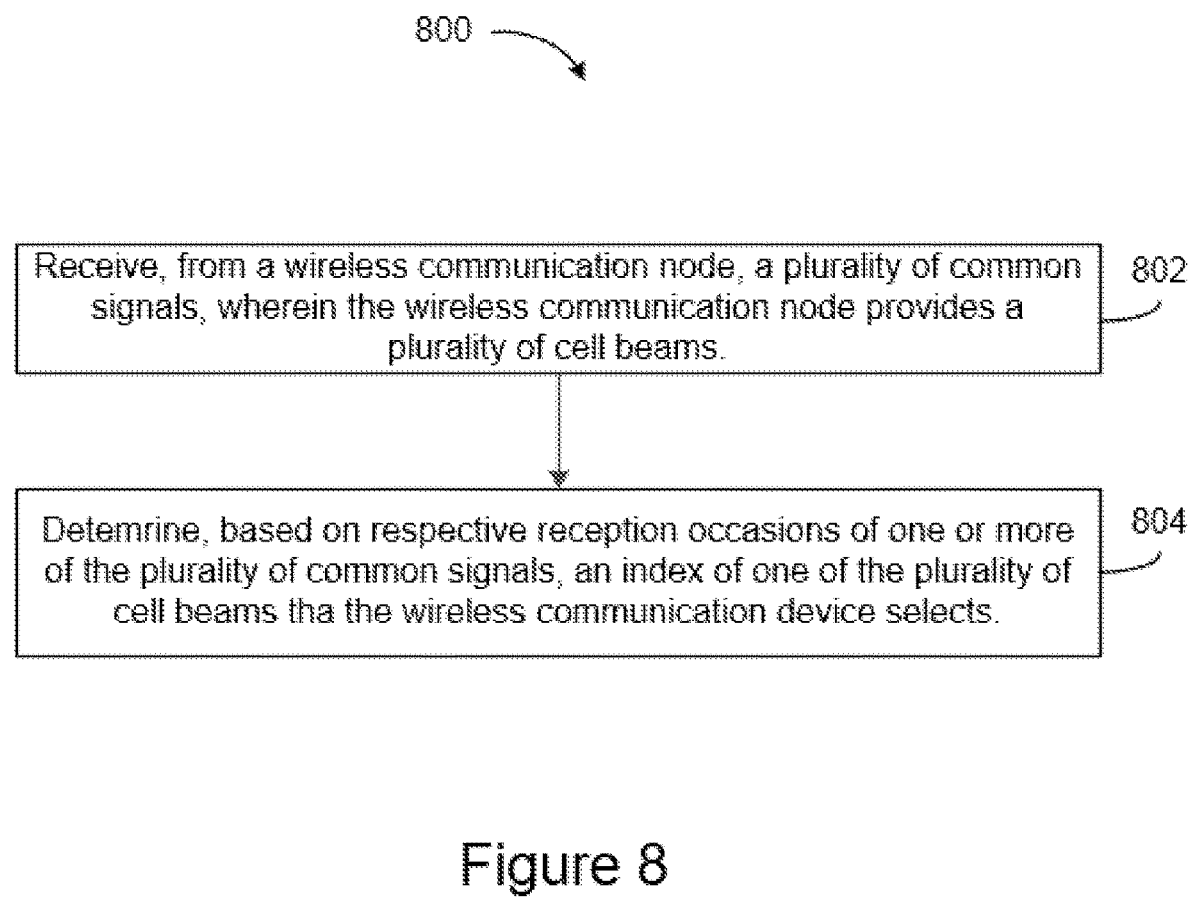

800

Receive, from a wireless communication node, a plurality of common signals, wherein the wireless communication node provides a plurality of cell beams.    802

Detemrine, based on respective reception occasions of one or more of the plurality of common signals, an index of one of the plurality of cell beams tha the wireless communication device selects.    804

Figure 8

Determine respective transmission occasions of a plurality of common signals.    902

Transmit, to a wireless communication node, according to the determined transmission occasions, the plurality of common signals over a plurality of cell beams.    904

METHOD AND APPARATUS FOR RADIO RESOURCE MAPPING AND SCHEDULING

CROSS-REFERENCE TO RELATED APPLICATION

This application claims the benefit of priority under 35 U.S.C. § 120 as a continuation of PCT Patent Application No. PCT/CN2020/101249, filed on Jul. 10, 2020, the disclosure of which is incorporated herein by reference in its entirety.

TECHNICAL FIELD

The disclosure relates generally to wireless communications and, more particularly, to systems and methods for radio resource mapping and scheduling.

BACKGROUND

Narrowband-internet of things (NB-IoT) and enhanced machine type communication (eMTC), such as bandwidth-reduced, low-complexity (BL) user equipment (UE) or coverage enhancement (CE) UE, are established as a $3^{rd}$ Generation Partnership Project (3GPP) standard for IoT connectivity. There are over 160 operators across 69 countries investing in NB-IoT network technologies, creating a global ecosystem of services and hardware vendors supporting everything from chipsets to full devices.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication method includes receiving, by a wireless communication device from a wireless communication node, a plurality of common signals. The wireless communication node provides a plurality of cell beams. The wireless communication method includes determining, by the wireless communication device, based on respective reception occasions of one or more of the plurality of common signals, an index of one of a plurality of cell beams that the wireless communication device selects.

In some embodiments, the one or more common signals include a primary synchronization signal and a secondary synchronization signal. In some embodiments, the method further includes determining, by the wireless communication device, a reception occasion of the primary synchronization signal and/or a reception occasion of the secondary synchronization signal based on identifying during which of a plurality of system frames the wireless communication device receives the primary synchronization signal and/or the secondary synchronization signal and determining, by the wireless communication device, according to the determined reception occasion of the primary synchronization signal and/or the determined reception occasion of the secondary synchronization signal, the index of the cell beam that the wireless communication device selects.

In some embodiments, a wireless communication method includes determining, by a wireless communication node, respective transmission occasions of a plurality of common signals and transmitting, by the wireless communication node to a wireless communication device, according to the determined transmission occasions, the plurality of common signals over a plurality of cell beams.

In some embodiments, the one or more common signals include a primary synchronization signal and a secondary synchronization signal. In some embodiments, the method further includes determining, by the wireless communication node, a transmission occasion of the primary synchronization signal and/or a transmission occasion of the secondary synchronization signal based on during which of a plurality of system frames the wireless communication node transmits the primary synchronization signal and/or the secondary synchronization signal, thereby causing the wireless communication device to select, according to the determined transmission occasion of the primary synchronization signal and/or the determined transmission occasion of the secondary synchronization signal, one of the plurality of cell beams.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 is a diagram illustrating an example relationship among a non-terrestrial network (NTN) cell, cell beams and satellite beams, in accordance with some embodiments of the present disclosure.

FIG. 4B is a diagram illustrating an example mapping between cell beams and PSSS/NSSS info, in accordance with some embodiments of the present disclosure.

FIG. 4C is a diagram illustrating an example mapping between cell beams and PSSS/NSSS info, in accordance with some embodiments of the present disclosure.

FIG. 4D is a diagram illustrating an example mapping between cell beams and PSSS/NSSS info, in accordance with some embodiments of the present disclosure.

FIG. 4E is a diagram illustrating an example mapping between cell beams and PSS/SSS info, in accordance with some embodiments of the present disclosure.

FIG. 5D is a diagram illustrating an example mapping between cell beams and MIB info, in accordance with some embodiments of the present disclosure.

FIG. 6C is a diagram illustrating an example mapping between cell beams and SIB1 info, in accordance with some embodiments of the present disclosure.

FIG. 6D is a diagram illustrating an example mapping between cell beams and SIB1 info, in accordance with some embodiments of the present disclosure.

FIG. 8 is a flowchart diagram illustrating a method for determining a cell beam, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
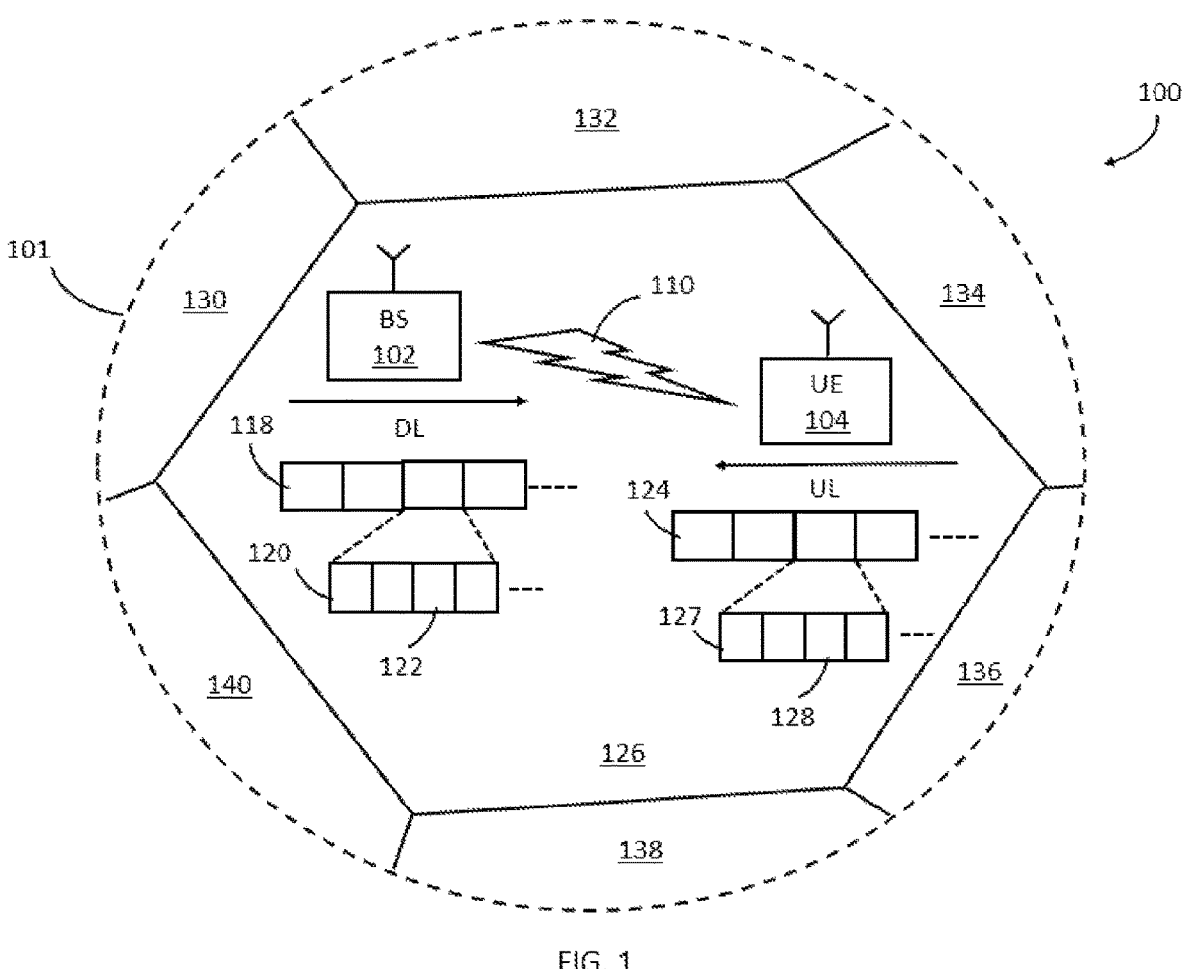
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
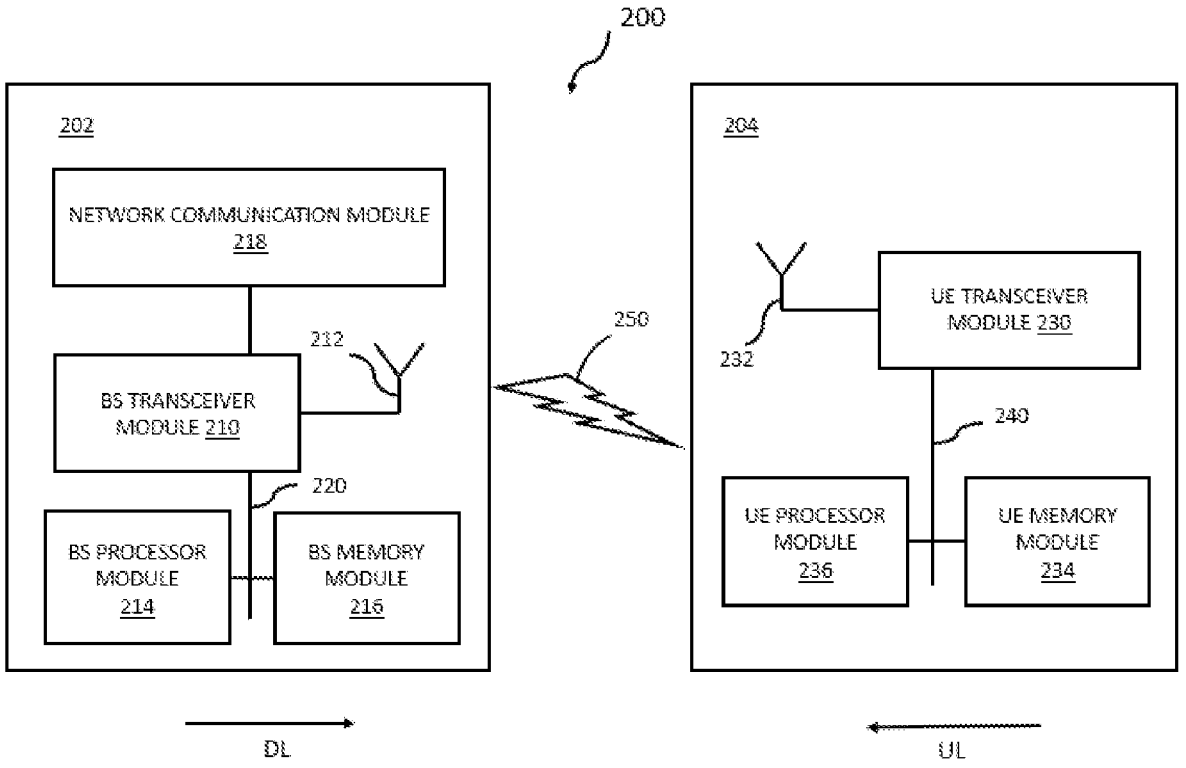
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Method and Apparatus for Radio Resource Mapping and Scheduling

Disclosed herein are embodiments for reducing the system information (SI) acquisition for a user equipment (UE, e.g., UE 104, UE 204, a mobile device, a wireless communication device, etc.) in an internet of things (IoT) cell over a non-terrestrial network (NTN), and for improving a capacity of the IoT cell over the NTN. In some embodiments, the NTN has a very large (e.g., greater than a predetermined) coverage area.

For an IoT network over an NTN, a satellite (e.g., the BS 102, the BS 202, a next generation NodeB (gNB), an evolved NodeB (eNB), a narrowband-IoT (NB-IoT), an enhanced machine type communication (eMTC) NodeB, a wireless communication node, the RF (Radio Frequency unit) of the BS 102, the RF of the BS 202, the RF of the gNB, the RF of the eNB, the RF of the NB-IoT NodeB, the RF of the eMTC NodeB, the RF of the wireless communication node, etc.) may cover a very large area, and there may be an IoT cell over the satellite (e.g., the IoT/NTN cell is an omni cell and may span several hundreds of kilometers). Very large cell coverage may lead very small (e.g., less than a predetermined) network capacity.

Furthermore, the low earth orbit (LEO) satellite may move quickly (e.g., less than a predetermined amount of time). For example, the UE may switch the coverage from one satellite to another satellite once per a predetermined amount of time (e.g., 10 minutes), and switch the coverage of the satellite beam more frequently). When the UE moves to a new cell, the UE may read the SI of the cell. Frequent SI reading may cost/consume much (e.g., greater than a predetermined amount of) UE power.

Disclosed herein are embodiments of a method and apparatus for improving the capacity of the IoT cell over the NTN and reducing the SI acquisition for the UE in the IoT cell over the NTN.

Figure 3:
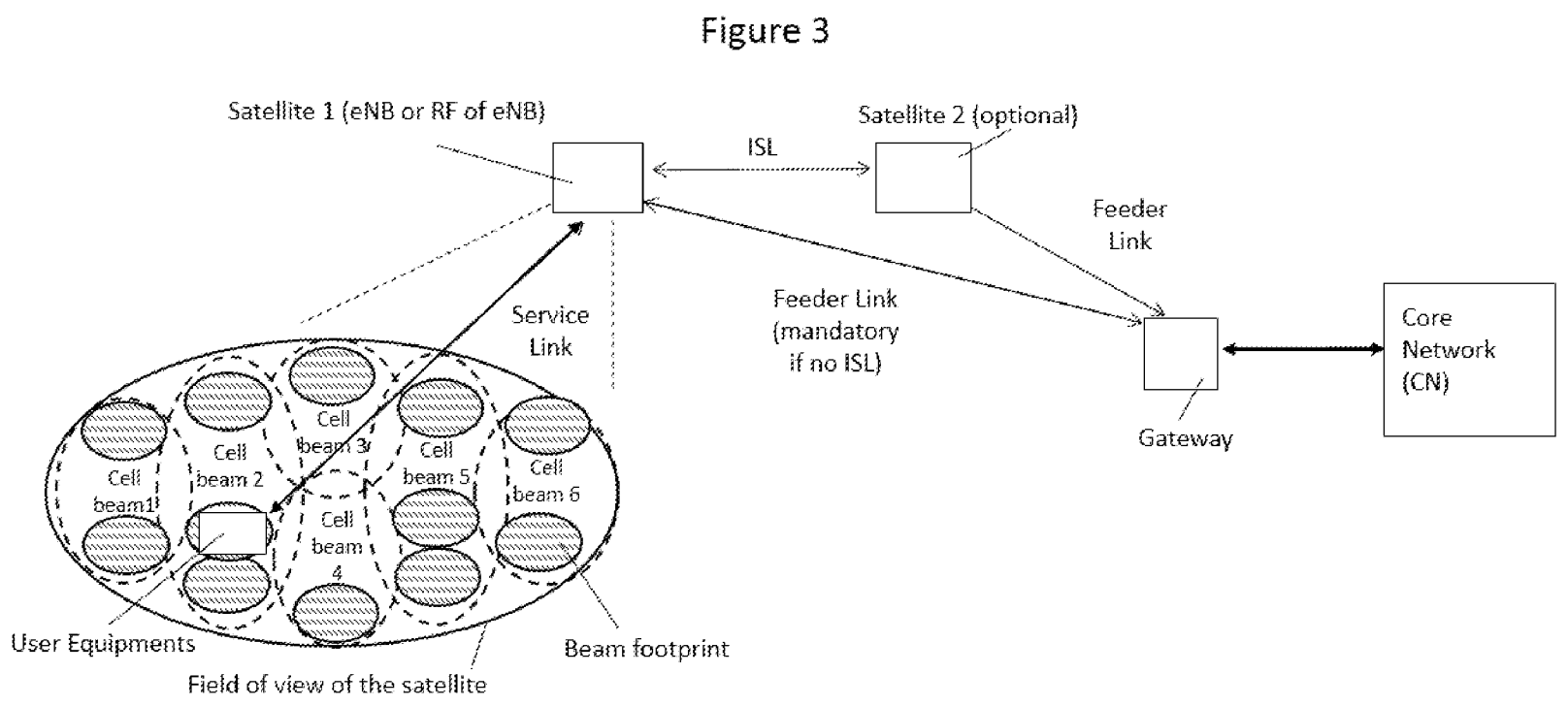

FIG. 3 is a diagram illustrating an example relationship among an NTN cell, cell beams and satellite beams, in accordance with some embodiments of the present disclosure. One cell has one cell identity, e.g., a physical cell identity (PCI) and can be split (e.g., separated, partitioned, divided, or otherwise arranged) into one or more cell beams. For example, the cell is split into to "m" number of cell beams, "m" is a positive integer. One cell beam can be mapped to one or more satellite beams (e.g., mapped to "n" number of satellite beams, "n" is a positive integer). "Cell beam" may be referred to as "cell sector," "cell area," or "synchronization signal block (SSB) beam," including at least one of "primary synchronization signal (PSS) block beam" and/or "secondary synchronization signal (SSS) block beam," etc., which is used to split the cell PSS/SSS/MIB/SIB1 transmitting area into a plurality of sub-areas. Each sub-area can have the similar RF propagation delay, similar channel propagation characteristics, similar antenna characteristics, similar spatial code characteristics, etc. One sub-area corresponds to a physical random access channel (PRACH) resource set, and based on a PRACH resource that the UE selects, the eNB (e.g., the RF of the eNB) can decide the sub-area that the UE selects (e.g., camps on).

Different cell beams in one cell may have the same common channel and/or signal (e.g., the contents of the common channel and/or signal are the same for different cell beams, which can reduce the SI reading frequency and save UE power). The transmission occasion of the common channel and/or signal may be different for different cell beams (see FIGS. 4A-7). Different cell beams in one cell can share time/frequency radio resources for a dedicated channel, which can improve the capacity of IoT cell over NTN. A wireless communication device receives, from a wireless communication node, a plurality of common signals. The wireless communication node provides a plurality of cell beams. The wireless communication device determines, based on respective reception occasions of one or more of the plurality of common signals, an index of one of a plurality of cell beams that the wireless communication device selects. A wireless communication node determines respective transmission occasions of a plurality of common signals and transmits, to a wireless communication device, according to the determined transmission occasions, the plurality of common signals over a plurality of cell beams.

In some embodiments, UE can receives a narrowband PSS (NPSS)/narrowband SSS (NSSS) of one or more cell beams, and selects the index of cell beam with the strongest radio signal. In some embodiments, the wireless communication device selects the cell beam based on at least one of: the cell beam having a strongest radio quality value in the plurality of cell beams, or the cell beam having a radio quality value above a predefined radio quality threshold. The radio quality includes at least one of: a Reference Signal Received Power (RSRP), a Reference Signal Received Quality (RSRQ), or a Reference Signal-Signal to Noise and Interference Ratio (RS-SINR). The pre-defined radio quality threshold is at least one of: provided by the wireless communication node in a system information block, or pre-defined.

One cell beam may be mapped to several satellite beams. In some embodiments, the satellite beams are not aware in the UE. In some embodiments, the apparatus and method disclosed herein determines the transmission occasion of the common channel and/or signal for cell beam and the UE selects a physical random access channel (PRACH) resource based on a selected cell beam. In some embodiments, the plurality of common signals include at least one of: a primary synchronization signal, a secondary synchronization signal, a physical broadcast channel signal, a master information block, and a system information block 1.

Figure 4A:
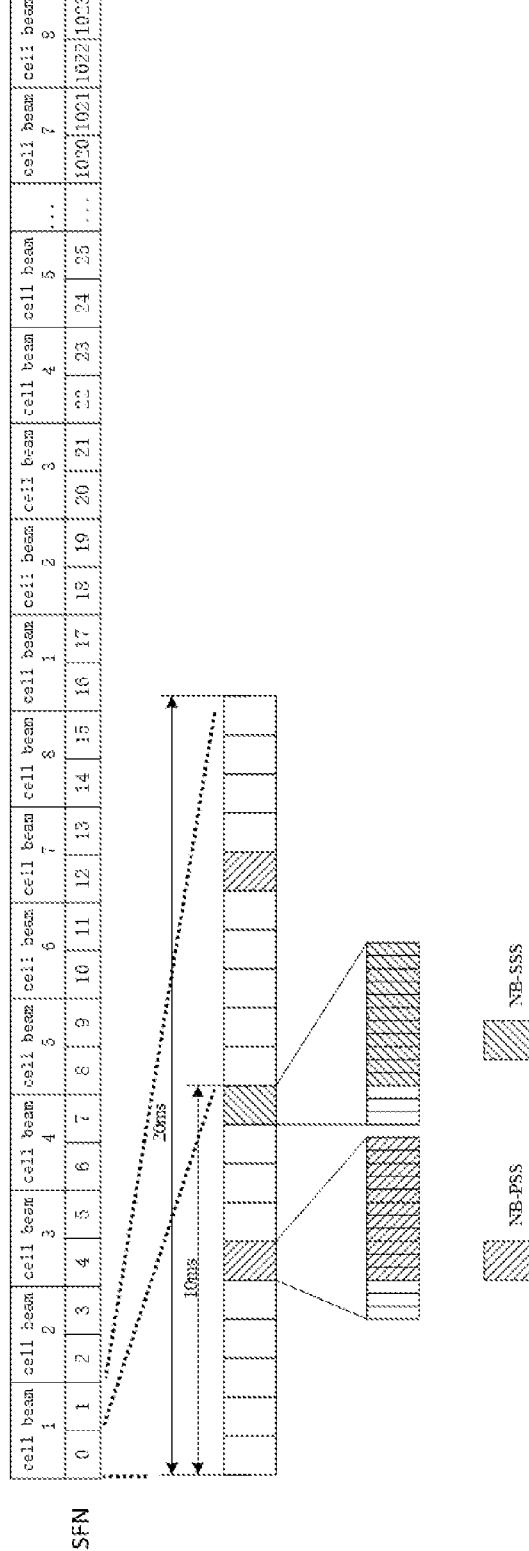
FIG. 4A is a diagram illustrating an example mapping between cell beams and narrowband primary synchronization signal (PSSS)/narrowband secondary synchronization signal (NSSS) information (info), in accordance with some embodiments of the present disclosure.

FIG. 4A is a diagram illustrating an example mapping between Cell beams and narrowband PSS (NPSS)/narrowband SSS (NSSS) information (info), in accordance with some embodiments of the present disclosure. In some embodiments, the NB-IoT NPSS is transmitted in subframe 5 in every radio frame, and the NSSS is transmitted in subframe 9 for frame structure type 1 or subframe 0 for frame structure type 2 in every two radio frames (e.g., fulfilling a system frame number (SFN) mod 2=0). Thus, in some embodiments, the cell beams can be identified by the SFN transmitting/receiving NPSS/NSSS. E.g., in FIG. 4A, there are 8 cell beams in one cell. In some embodiments, the eNB transmits the NPSS/NSSS of each of the cell beams in one or more respective SFNs, and if the UE receives the NPSS/NSSS in the one or more respective SFNs, it can determine that it is in the corresponding cell beam. For example, the eNB transmits the NPSS/NSSS of cell beam 1 in the first two SFN, the eNB transmits the NPSS/NSSS of cell beam 2 in the second two SFN, the eNB transmits the NPSS/NSSS of cell beam 3 in the third two SFN, and so on. If the UE receives the NPSS/NSSS in the first two SFN, it can be aware (e.g., determine) that it is in cell beam 1. If the UE receives the NPSS/NSSS in the second two SFN, it can be aware that it is in cell beam 2. If the UE receives NPSS/NSSS in the third two SFN, it can be aware that it is in cell beam 3, and so on.

In some embodiments, if the UE receives the NPSS/NSSS of multiple cell beams, the wireless communication device selects the cell beam based on at least one of: the cell beam having a strongest radio quality value in the plurality of cell beams, or the cell beam having a radio quality value above a predefined radio quality threshold. The radio quality includes at least one of: a Reference Signal Received Power (RSRP), a Reference Signal Received Quality (RSRQ), or a Reference Signal-Signal to Noise and Interference Ratio (RS-SINR). The pre-defined radio quality threshold is at least one of: provided by the wireless communication node in a system information block, or predefined.

In some embodiments, the SFN for NPSS/NSSS of cell beam i fulfills (e.g., satisfies) the following condition (e.g., equation):

$$\text{Floor(SFN/2)mod } 8+1=i, \text{ where Floor}(x)\text{equals the}$$
$$\text{largest integer number that less than } x, \text{ and}$$
$$\text{``}A/B\text{'' means } A \text{ divide } B.$$

In some embodiments, if there are m number of cell beams in one cell, then the SFN for NPSS/NSSS of cell beam i fulfills the following condition:

$$\text{Floor(SFN/2)mod } m+1=i.$$

The SFN can be obtained from a master information block (MIB) and a physical broadcast channel (PBCH). For example, the 4 most significant bits (MSB) of the SFN comes from the parameter systemFrameNumber-MSB in the MIB, and the 6 least significant bits (LSB) of the SFN are acquired implicitly by decoding the narrowband PBCH (NPBCH).

In some embodiments, the one or more common signals include a primary synchronization signal and a secondary synchronization signal. In some embodiments, the wireless communication device determines a reception occasion of the primary synchronization signal and/or a reception occasion of the secondary synchronization signal based on identifying during which of a plurality of system frames the wireless communication device receives the primary synchronization signal and/or the secondary synchronization signal. In some embodiments, the wireless communication device determines, according to the determined reception occasion of the primary synchronization signal and/or the determined reception occasion of the secondary synchronization signal, the index of the cell beam that the wireless communication device selects. In some embodiments, the wireless communication node determines a transmission occasion of the primary synchronization signal and/or a transmission occasion of the secondary synchronization signal based on during which of a plurality of system frames the wireless communication node transmits the primary synchronization signal and/or the secondary synchronization signal, thereby causing the wireless communication device to select, according to the determined transmission occasion of the primary synchronization signal and/or the determined transmission occasion of the secondary synchronization signal, one of the plurality of cell beams.

Figure 4B:
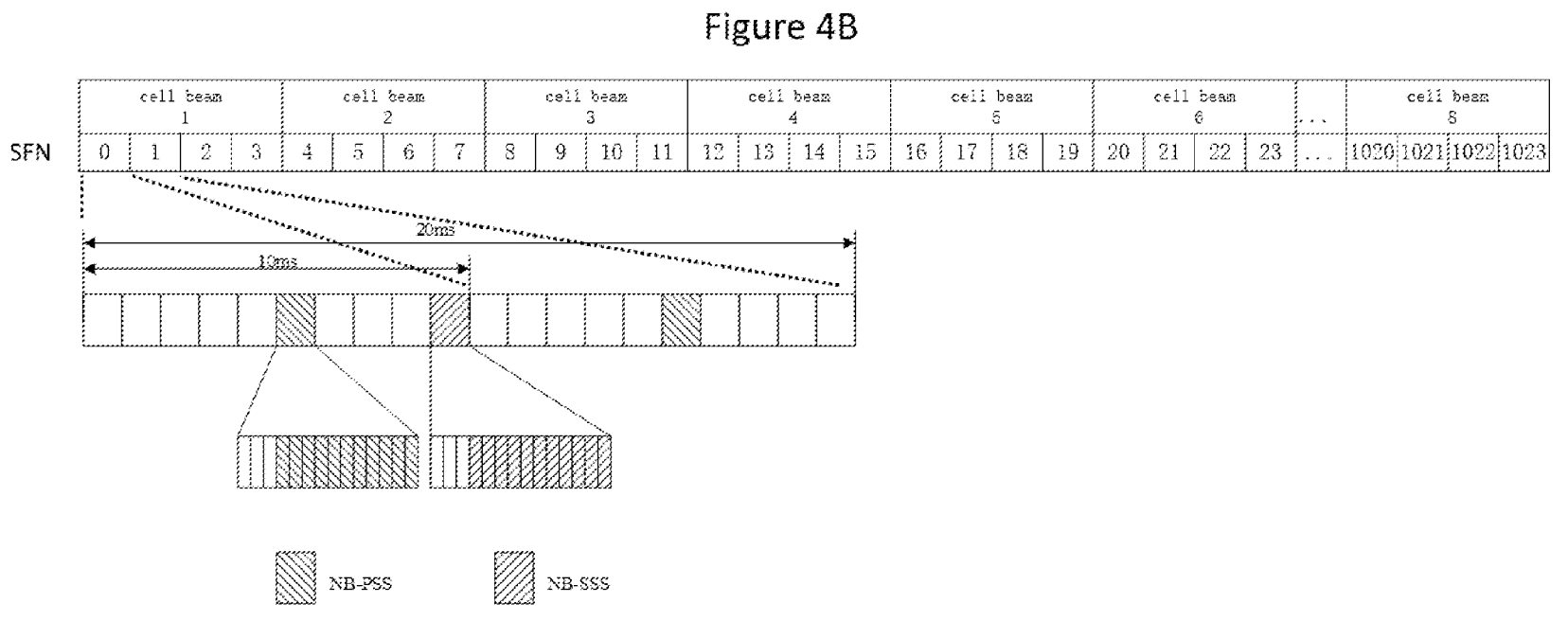

FIG. 4B is a diagram illustrating an example mapping between cell beams and PSSS/NSSS info, in accordance with some embodiments of the present disclosure. In some embodiments the NPSS/NSSS are continuously transmitted/received several times (e.g., repeated with nsss-NumOccDiffPrecoders times or with max value of nsss-NumOccDiffPrecoders times) in one cell beam, and then in the next beam. In some embodiments, nsss-NumOccDiffPrecoders indicates a number of consecutive NSSS occasions that use different precoders for NSSS transmission, with the value range of ENUMERATED {n1, n2, n4, n8}, Value n1 corresponds to 1 occasion, n2 corresponds to 2 occasions, and so on.

As shown in FIG. 4B, there are 8 cell beams in one cell, where nsss-NumOccDiffPrecoders=2. In some embodiments, the eNB transmits the NPSS/NSSS of cell beam 1 in the first four SFN. If the UE receives the NPSS/NSSS in the first four SFN, it can be aware that it is in cell beam 1. The eNB transmits the NPSS/NSSS of cell beam 2 in the second four SFN. If the UE receives the NPSS/NSSS in the second four SFN, it can be aware that it is in cell beam 2. The eNB transmits the NPSS/NSSS of cell beam 3 in the third four SFN. If the UE receives the NPSS/NSSS in the third four SFN, it can be aware that it is in cell beam 3, and so on. In some embodiments, if there are m number of cell beams in one cell, then the SFN for NPSS/NSSS of cell beam i fulfills the following condition:

$$\text{Floor(SFN/2)mod}(m*\text{nsss-NumOccDiffPrecoders})+1=i$$

In some embodiments, the wireless communication device determines the reception occasion of the primary synchronization signal and/or the reception occasion of the secondary synchronization signal further based on identifying a number of repetitive receptions of the primary synchronization signal and/or a number of repetitive receptions of the secondary synchronization signal for each of the plurality of cell beams.

Figure 4C:
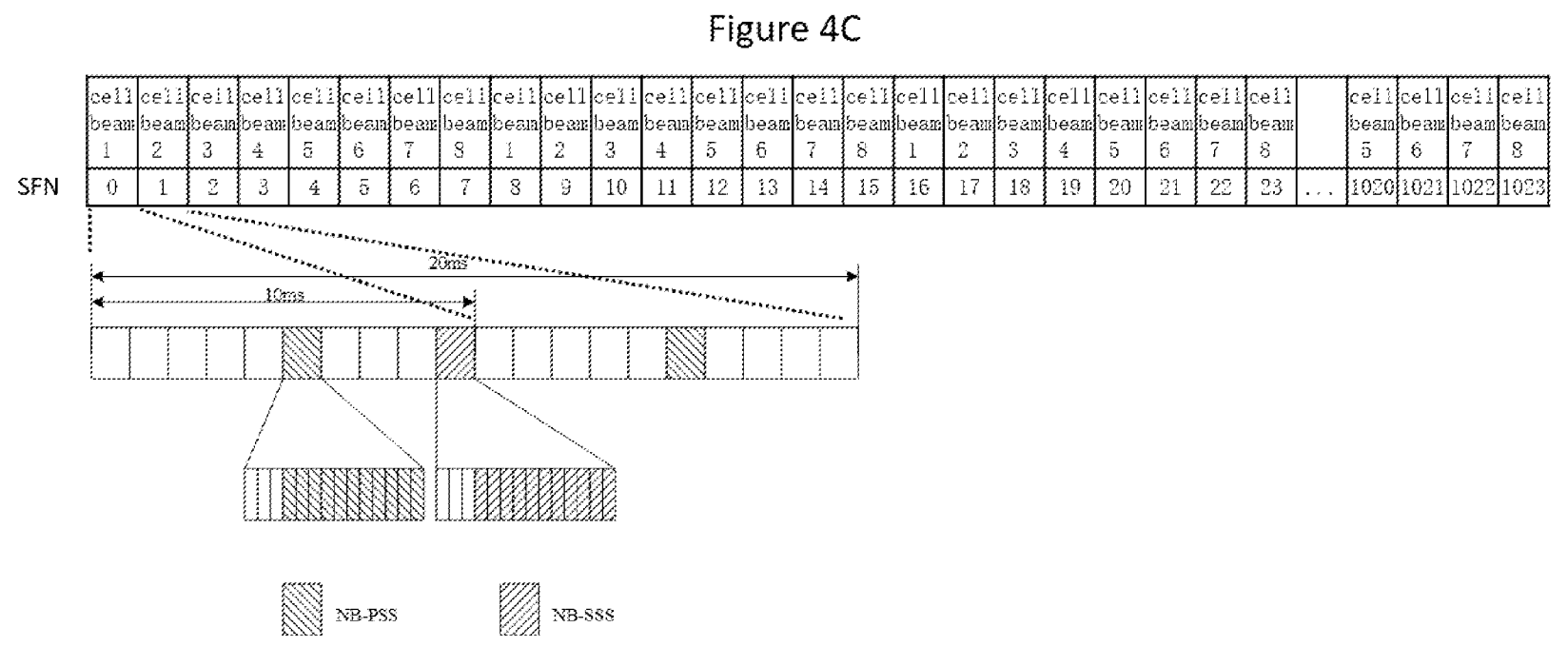

FIG. 4C is a diagram illustrating an example mapping between cell beams and PSSS/NSSS info, in accordance with some embodiments of the present disclosure. In some embodiments, only the NPSS are used for cell beam selection. E.g., NPSS are transmitted/received several times (e.g., "n" times, "n" is a positive integer) in one cell beam, and then in the next beam.

As shown in FIG. 4C, there are 8 cell beams in one cell. In some embodiments, the eNB transmits the NPSS of cell beam 1 in the first SFN. If the UE receives the NPSS in the first SFN, it can be aware that it is in cell beam 1. The eNB transmits the NPSS of cell beam 2 in the second SFN. If the UE receives the NPSS in the second SFN, it can be aware that it is in cell beam 2. The eNB transmits the NPSS of cell beam 3 in the third four SFN, and if UE receives NPSS in the third SFN, it can be aware that it is in cell beam 3, and so on. In some embodiments, if there are m number of cell beams in one cell, then the SFN for the NPSS of cell beam i fulfills the following condition:

$$\text{SFN mod } m+1=1.$$

In some embodiments, the wireless communication device determines the reception occasion of only the primary synchronization signal further based on identifying a number of repetitive receptions of the primary synchronization signal for each of the plurality of cell beams.

Figure 4D:
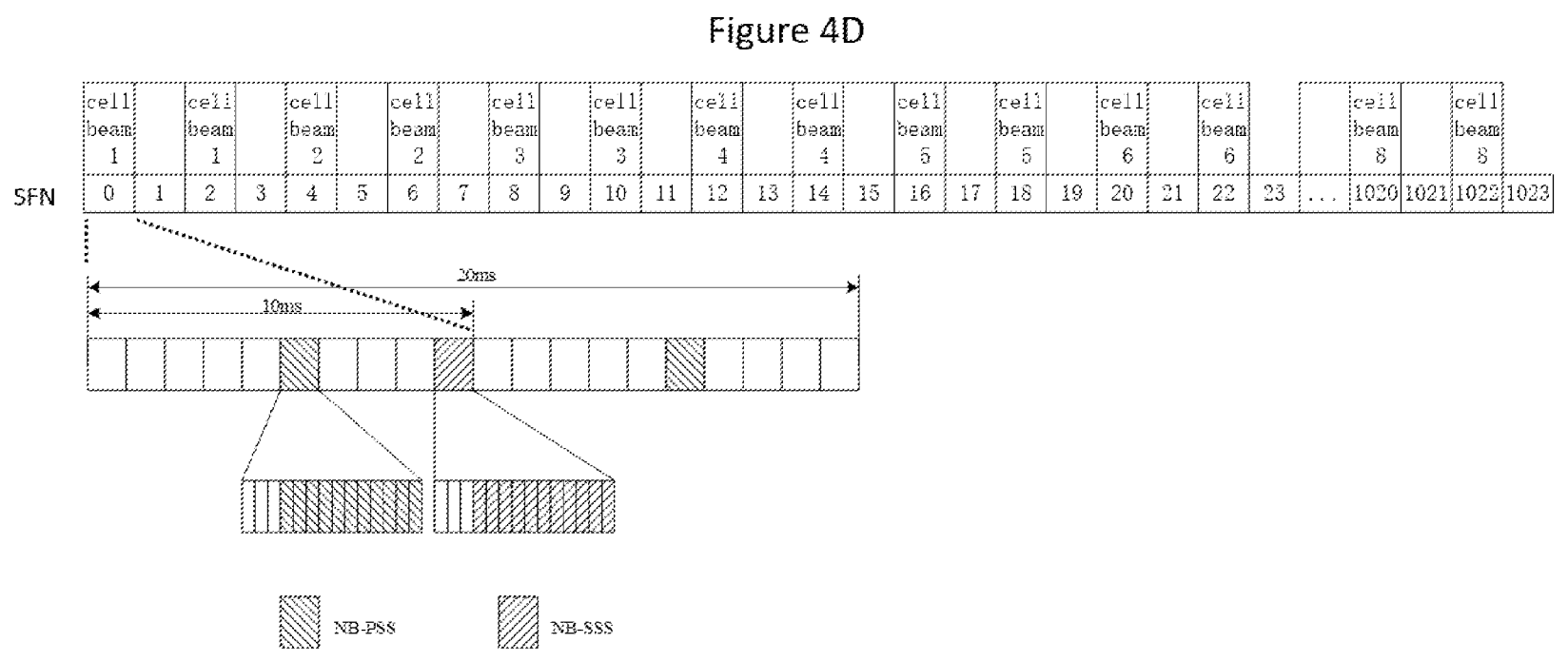

FIG. 4D is a diagram illustrating an example mapping between cell beams and PSSS/NSSS info, in accordance with some embodiments of the present disclosure. In some embodiments, only the NSSS are used for cell beam selection. E.g., the NSSS are transmitted/received several times (e.g., repeated with 1 time, with nsss-NumOccDiffPrecoders times or with max value of nsss-NumOccDiffPrecoders times) in one cell beam, and then in the next beam.

As shown in FIG. 4D, there are 8 cell beams in one cell. In some embodiments, the eNB transmits the NSSS of cell beam 1 in the first k number of SFN carrying NSSS. If the UE receives the NSSS in the first k number of SFN carrying the NSSS, it can be aware that it is in cell beam 1. The eNB transmits the NSSS of cell beam 2 in the second k number of SFN carrying NSSS. If the UE receives the NSSS in the second k number of SFN carrying NSSS, it can be aware that it is in cell beam 2. The eNB transmits the NSSS of cell beam 3 in the third k number of SFN carrying the NSSS. If the UE receives the NSSS in the third k number of SFN carrying the NSSS, it can be aware that it is in the cell beam 3, and so on. In some embodiments, if there are m number of cell beams in one cell, and the NSSS are transmitted/received k times (e.g., repeated with one time, with nsss-NumOccDiffPrecoders times or with max value of nsss-NumOccDiffPrecoders times) in one cell beam, and then in the next beam, then the SFN for NSSS of cell beam i fulfills the following condition:

$$(\text{SFN mod 2})=0 \text{ and floor(SFN/}(k*2))\text{mod } m+1=i.$$

In some embodiments, the wireless communication device determines the reception occasion of only the secondary synchronization signal further based on identifying a number of repetitive receptions of the secondary synchronization signal for each of the plurality of cell beams.

Figure 4E:
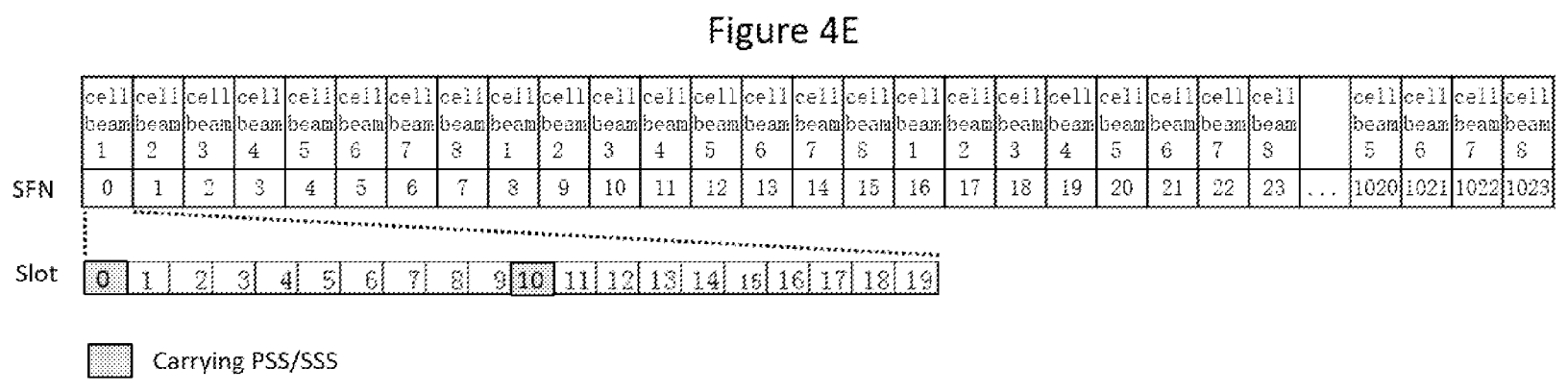

FIG. 4E is a diagram illustrating an example mapping between cell beams and PSS/SSS info, in accordance with some embodiments of the present disclosure. In some embodiments, the PSS is transmitted/received in the SSS periodicity in sequence for cell beams. E.g., the eNB transmits the PSS/SSS of cell beam 1 in the first k number of SFN carrying the SSS. If the UE receives at least one of the PSS or SSS in the first k number of SFN carrying SSS, it can be aware that it is in the cell beam 1. The eNB transmits the PSS/SSS of cell beam 2 in the second k number of SFN carrying the SSS. If the UE receives at least one of the PSS or SSS in the second k number of SFN carrying the SSS, it can be aware that it is in the cell beam 2. The eNB transmits the PSS/SSS of cell beam 3 in the third k number of SFN carrying the SSS. If the UE receives at least one of the PSS or SSS in the third k number of SFN carrying the SSS, it can be aware that it is in the cell beam 3, and so on.

In some embodiments, the method mapping from PSS/SSS to cell beams can be used for eMTC. E.g., for frequency-division duplexing (FDD) eMTC except for a multimedia broadcast multicast service (MBMS)-dedicated cell, the primary synchronization signal (PSS) and the second synchronization signal (SSS) is mapped to the last orthogonal frequency-division multiplexing (OFDM) symbol in slots 0 and 10 in every SFN. Thus, the cell beams can be identified by the SFN transmitting/receiving PSS/SSS.

As shown in FIG. 4E, there are 8 cell beams in one cell. In some embodiments, the eNB transmits the PSS/SSS of cell beam 1 in the first two SFN. If the UE receives the PSS/SSS in the first two SFN, it can be aware that it is in the cell beam 1. The eNB transmits PSS/SSS of cell beam 2 in the second two SFN. If the UE receives the PSS/SSS in the second two SFN, it can be aware that it is in the cell beam 2. The eNB transmits the PSS/SSS of cell beam 3 in the third two SFN. If the UE receives the PSS/SSS in the third two SFN, it can be aware that it is in the cell beam 3, and so on. In some embodiments, if there are m number of cell beams in one cell, then the SFN for PSS/SSS of cell beam i fulfills the following condition:

SFN mod $m+1=i$.

In some embodiments, the cell beams are determined by the PSS and SSS. E.g. based on the PSS, a set of cell beams can be determined, and based on the SSS, the (e.g., subset) cell beams in the set of cell beams can be determined. For example, if there are 8 cell beams, the SFN for PSS, SSS in each cell beam are as follows:

wireless communication device receives the primary synchronization signal and/or the secondary synchronization signal. In some embodiments, the wireless communication device determines, according to the determined reception occasion of the primary synchronization signal and/or the determined reception occasion of the secondary synchronization signal, the index of the cell beam that the wireless communication device selects. In some embodiments, the periodicity of the cell beam includes one or more of a periodicity of reception of the secondary synchronization signal, which are at least one of: provided by the wireless communication node in a physical broadcast channel, provided by the wireless communication node in a master information block, provided by the wireless communication node in a system information block, or predefined time length. In some embodiments, the wireless communication node determines, a transmission occasion of the primary synchronization signal and/or a transmission occasion of the secondary synchronization signal based on during which of a plurality of system frames, that correspond to a periodicity of transmissions of the secondary synchronization signal, the wireless communication node transmits the primary synchronization signal and/or the secondary synchronization signal, thereby causing the wireless communication device to select, according to the determined transmission occasion of the primary synchronization signal and/or the determined transmission occasion of the secondary synchronization signal, one of the plurality of cell beams. In some embodiments, the periodicity of cell beams can be the time length that primary synchronization signal and secondary synchronization signal transmit continuously over one cell beam, or the time interval between two polling pattern that primary synchronization signal and secondary synchronization signal transmit over all cell beams in sequence with wrap-around. During the time length that primary synchronization signal and secondary synchronization signal transmit continuously over one cell beam, the cell beam index is the same.

Figure 5A:
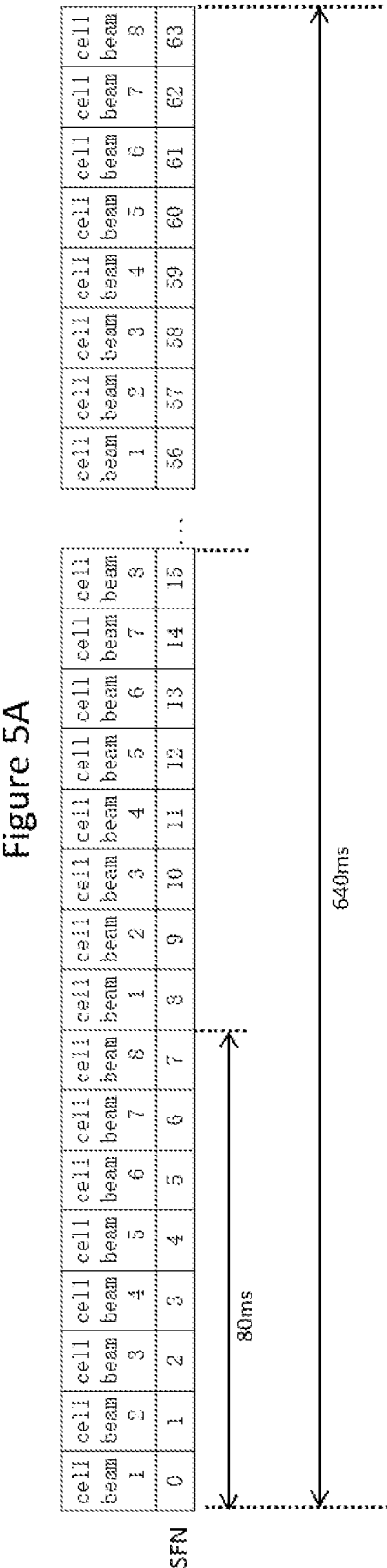
FIG. 5A is a diagram illustrating an example mapping between cell beams and master information block (MIB) info, in accordance with some embodiments of the present disclosure.

FIG. 5A is a diagram illustrating an example mapping between cell beams and master information block (MIB) info, in accordance with some embodiments of the present disclosure. In some embodiments, the MasterInformationBlock-NB (MIB-NB) uses a fixed schedule with a periodicity of 640 ms and repetitions made within 640 ms. The first transmission of the MIB-NB is scheduled in radio frames for which the SFN mod 64=0 and repetitions are arranged in 8 independently decodable blocks of 80 ms duration. Thus, the cell beams can be identified by the SFN transmitting/receiving MIB.

| Cell beam1 | Cell beam2 | Cell beam3 | Cell beam4 | Cell beam5 | Cell beam6 | Cell beam7 | Cell beam8 |
|---|---|---|---|---|---|---|---|
| PSS SFN: 0 | PSS SFN: 0 | PSS SFN: 1 | PSS SFN: 1 | PSS SFN: 2 | PSS SFN: 2 | PSS SFN: 3 | PSS SFN: 3 |
| SSS SFN: 0 | SSS SFN: 2 | SSS SFN: 0 | SSS SFN: 2 | SSS SFN: 0 | SSS SFN: 2 | SSS SFN: 0 | SSS SFN: 2 |

Once the UE detects PSS in SFN0, it can be aware that it is in Cell beam1 or Cell beam2. If the UE further detects SSS in SFN0, it can be decided that it is in Cell beam1.

In some embodiments, the one or more common signals include a primary synchronization signal and a secondary synchronization signal. In some embodiments, the wireless communication device determines a reception occasion of the primary synchronization signal and/or a reception occasion of the secondary synchronization signal based on identifying during which of a plurality of system frames, that correspond to a periodicity of the plurality of cell beams, the E.g., in FIG. 5A, there are 8 cell beams in one cell. In some embodiments, the MIB are transmitted/received per SFN in sequence in the cell beams. For example, the eNB transmits the MIB of cell beam 1 in the first SFN carrying the MIB, if the UE receives the MIB in the first SFN carrying the MIB, it can be aware that it is in cell beam 1. The eNB transmits the MIB of cell beam 2 in the second SFN carrying the MIB. If the UE receives the MIB in the second SFN carrying the MIB, it can be aware that it is in cell beam 2. The eNB transmits the MIB of cell beam 3 in the third SFN carrying the MIB. If the UE receives the MIB in the third SFN carrying the MIB, it can be aware that it is in cell beam 3, and so on.

In some embodiments, if the UE receives the NPSS/NSSS/MIB of multiple cell beams, the wireless communication device selects the cell beam based on at least one of: the cell beam having a strongest radio quality value in the plurality of cell beams, or the cell beam having a radio quality value above a predefined radio quality threshold. The radio quality includes at least one of: a Reference Signal Received Power (RSRP), a Reference Signal Received Quality (RSRQ), or a Reference Signal-Signal to Noise and Interference Ratio (RS-SINR). The pre-defined radio quality threshold is at least one of: provided by the wireless communication node in a system information block, or pre-defined.

In some embodiments, if there are m number of cell beams in one cell, then the SFN for MIB of cell beam i fulfills the following condition:

SFN mod $m+1=1$.

In some embodiments, the one or more common signals include a master information block. In some embodiments, the wireless communication device determines a reception occasion of the master information block based on identifying during which of a plurality of system frames the wireless communication device receives the master information block via a physical broadcast channel (PBCH). In some embodiments, the wireless communication device determines, according to the determined reception occasion, the index of cell beam that the wireless communication device selects. In some embodiments, the wireless communication node determines a transmission occasion of the master information block based on during which of a plurality of system frames the wireless communication node transmits the master information block via a physical broadcast channel (PBCH), thereby causing the wireless communication device to select, according to the determined transmission occasion, one of the plurality of cell beams.

Figure 5B:
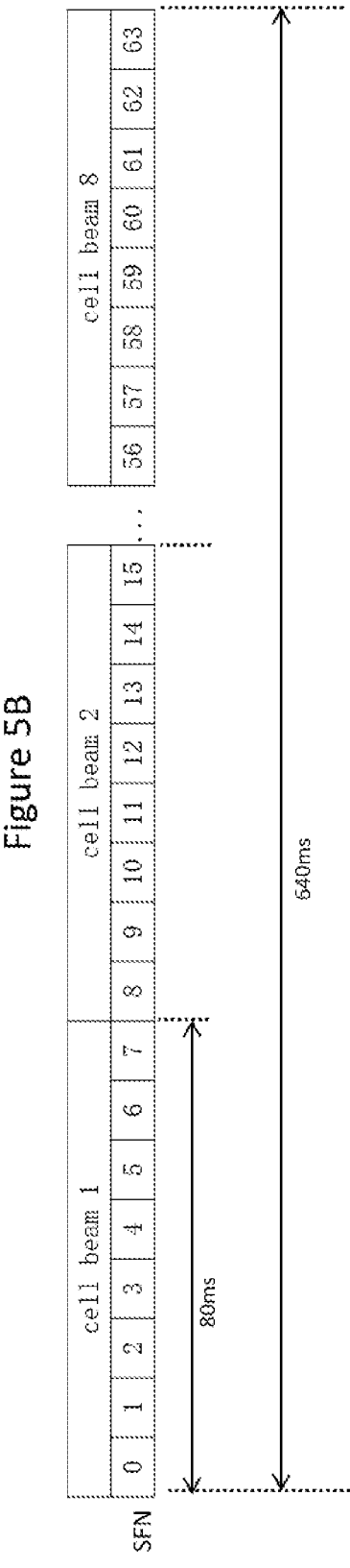
FIG. 5B is a diagram illustrating an example mapping between cell beams and MIB info, in accordance with some embodiments of the present disclosure.

FIG. 5B is a diagram illustrating an example mapping between cell beams and MIB info, in accordance with some embodiments of the present disclosure. As shown in FIG. 5B, the MIB are transmitted/received per 80 milliseconds (ms) (e.g., MIB repetitions duration in 8 independently decodable blocks) in sequence in the cell beams. For example, the eNB transmits the MIB of cell beam 1 in the first MIB repetitions duration. If the UE receives the MIB in the MIB repetitions duration, it can be aware that it is in the cell beam 1. The eNB transmits the MIB of cell beam 2 in the second MIB repetitions duration. If the UE receives the MIB in the second MIB repetitions duration, it can be aware that it is in the cell beam 2. The eNB transmits the MIB of cell beam 3 in the third MIB repetitions duration. If the UE receives MIB in the third MIB repetitions duration, it can be aware that it is in the cell beam 3, and so on. In some embodiments, if there are m number of cell beams in one cell, then the SFN for MIB of cell beam i fulfills the following condition:

Floor(SFN/8)mod $m+1=1$.

Figure 5C:
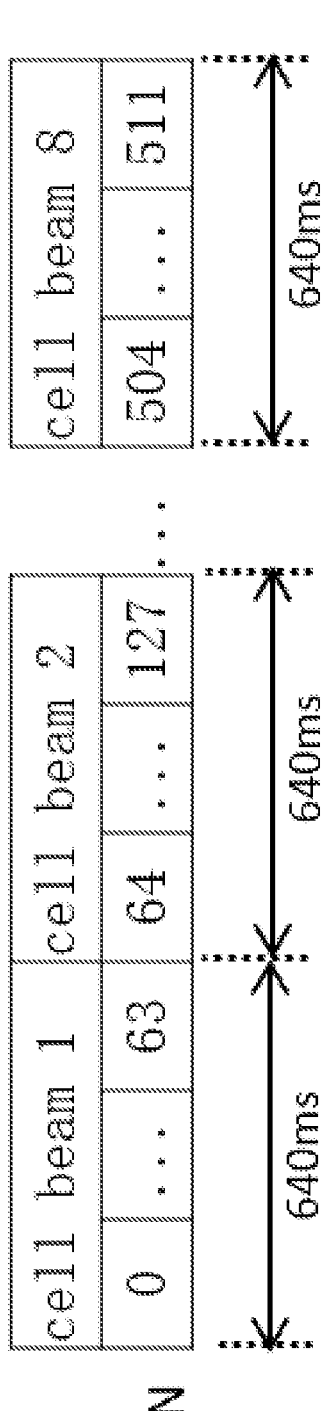
FIG. 5C is a diagram illustrating an example mapping between cell beams and MIB info, in accordance with some embodiments of the present disclosure.

FIG. 5C is a diagram illustrating an example mapping between cell beams and MIB info, in accordance with some embodiments of the present disclosure. As shown in FIG. 5C, the MIB are transmitted/received per 640 ms (e.g., MIB periodicity) in sequence in cell beams. For example, the eNB transmits the MIB of cell beam 1 in the first MIB periodicity. If the UE receives the MIB in the MIB periodicity, it can be aware that it is in the cell beam 1. The eNB transmits the MIB of cell beam 2 in the second MIB periodicity. If the UE receives the MIB in the second MIB periodicity, it can be aware that it is in the cell beam 2. The eNB transmits the MIB of cell beam 3 in the third MIB periodicity. If the UE receives the MIB in the third MIB periodicity, it can be aware that it is in the cell beam 3, and so on. In some embodiments, if there are m number of cell beams in one cell, then the SFN for MIB of cell beam i fulfills the following condition:

Floor(SFN/64)mod $m+1=1$.

In some embodiments, the wireless communication device determines the reception occasion of the master information block further based on identifying a periodicity of receptions of the master information block. In some embodiments, the periodicity is either 640 milliseconds, 80 milliseconds, or 40 milliseconds.

In some embodiments, the NPSS/NSSS are all transmitted/received with in the MIB periodicity in sequence for cell beams. E.g., the eNB transmits the NPSS/NSSS/MIB of the cell beam 1 in the first MIB periodicity. If the UE receives at least one of the NPSS, the NSSS, or the MIB in the first MIB periodicity, it can be aware that it is in the cell beam 1. The eNB transmits NPSS/NSSS/MIB of cell beam 2 in the second MIB periodicity. And if UE receives at least one of the NPSS, the NSSS, or the MIB in the second MIB periodicity, it can be aware that it is in the cell beam 2. The eNB transmits the NPSS/NSSS/MIB of cell beam 3 in the third MIB periodicity. If the UE receives at least one of the NPSS, the NSSS, or the MIB in the third MIB periodicity, it can be aware that it is in the cell beam 3, and so on.

Figure 5D:
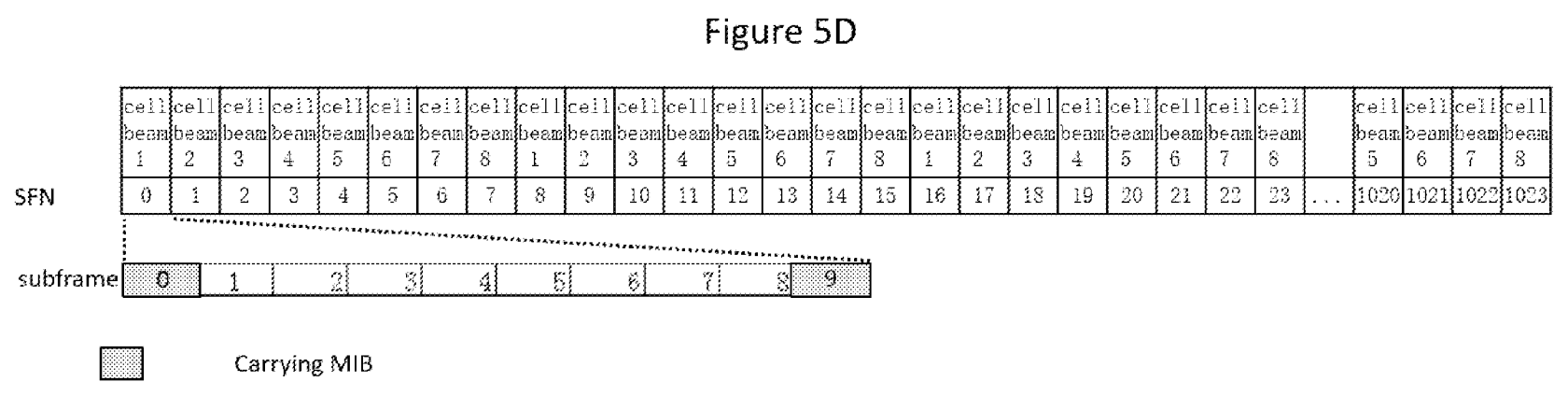

FIG. 5D is a diagram illustrating an example mapping between cell beams and MIB info, in accordance with some embodiments of the present disclosure. In some embodiments, the method mapping from MIB to cell beams can be used for eMTC. E.g. for the FDD eMTC, the MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For FDD system with a bandwidth larger than 1.4 MHz that supports BL UEs or UEs in CE, the MIB transmission may additionally be repeated in subframe #0 of the same radio frame, and in subframe #9 of the previous radio frame for FDD. Thus, the cell beams can be identified by the SFN transmitting/receiving MIB.

As shown in FIG. 5D, there are 8 cell beams in one cell, and the MIB is transmitted/received with in the MIB repetition periodicity in sequence for cell beams. E.g., the eNB transmits the MIB of cell beam 1 in the first SFN. If the UE receives the MIB in the first SFN, it can be aware that it is in the cell beam 1. The eNB transmits the MIB of cell beam 2 in the second SFN. If the UE receives the MIB in the second SFN, it can be aware that it is in the cell beam 2. The eNB transmits the MIB of cell beam 3 in the third SFN. If the UE receives the MIB in the third SFN, it can be aware that it is in the cell beam 3, and so on. In some embodiments, if there are m number of cell beams in one cell, then the SFN for MIB of cell beam i fulfills the following condition:

SFN mod $m+1=1$.

Figure 5E:
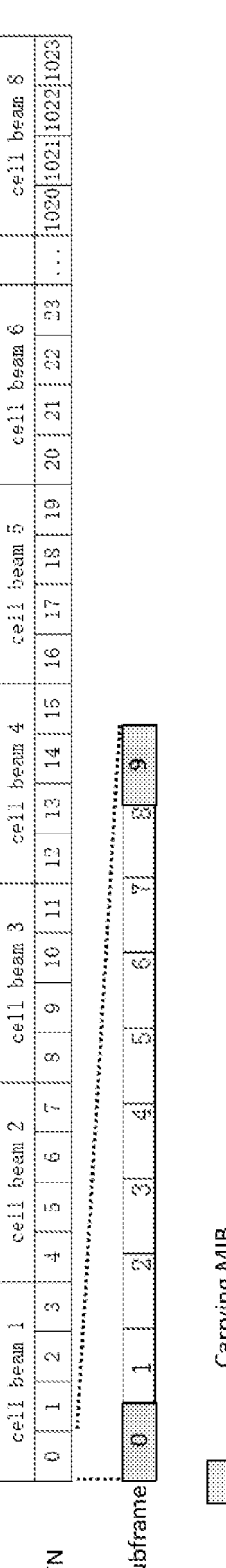
FIG. 5E is a diagram illustrating an example mapping between cell beams and MIB info, in accordance with some embodiments of the present disclosure.

FIG. 5E is a diagram illustrating an example mapping between cell beams and MIB info, in accordance with some embodiments of the present disclosure. As shown in FIG. 5E, there are 8 cell beams in one cell, and the MIB is transmitted/received with in the MIB scheduling periodicity in sequence for cell beams. E.g., the eNB transmits the MIB of cell beam 1 in the first four SFN. If the UE receives the MIB in the first four SFN, it can be aware that it is in the cell beam 1. The eNB transmits the MIB of cell beam 2 in the second four SFN. If the UE receives the MIB in the second four SFN, it can be aware that it is in the cell beam 2. The eNB transmits the MIB of cell beam 3 in the third four SFN. If the UE receives the MIB in the third four SFN, it can be aware that it is in the cell beam 3, and so on. In some embodiments, if there are m number of cell beams in one cell, then the SFN for MIB of cell beam i fulfills the following condition:

$$Floor(SFN/4) \bmod m + 1 = 1.$$

In some embodiments, the PSS/SSS are all transmitted/received with in the MIB periodicity in sequence for cell beams. E.g., the eNB transmits the PSS/SSS/MIB of cell beam 1 in the first MIB periodicity. If the UE receives at least one of the PSS, the SSS, or the MIB in the first MIB periodicity, it can be aware that it is in the cell beam 1. The eNB transmits the PSS/SSS/MIB of cell beam 2 in the second MIB periodicity. If the UE receives at least one of the PSS, the SSS, or the MIB in the second MIB periodicity, it can be aware that it is in the cell beam 2. The eNB transmits the PSS/SSS/MIB of cell beam 3 in the third MIB periodicity. If the UE receives at least one of the PSS, the SSS, or the MIB in the third MIB periodicity, it can be aware that it is in the cell beam 3 and so on. In some embodiments, the periodicity of cell beams can be the time length that primary synchronization signal, secondary synchronization signal and master information block transmit continuously over ments, the periodicity of the cell beam includes one or more of a scheduling period of the master information block, or one or more of a repetition period of the master information block, which are at least one of: provided by the wireless communication node in a physical broadcast channel, provided by the wireless communication node in the master information block, provided by the wireless communication node in a system information block, or a predefined. In some embodiments, the wireless communication node determines a transmission occasion of the primary synchronization signal, a transmission occasion of the secondary synchronization signal, and/or a transmission occasion of the master information block based on during which of a plurality of system frames, that correspond to a periodicity of transmissions of the master information block, the wireless communication node transmits the primary synchronization signal, the secondary synchronization signal, and/or the master information block, thereby causing the wireless communication device to select, according to the determined transmission occasion of the primary synchronization signal, the determined transmission occasion of the secondary synchronization signal, and/or the determined transmission occasion of the master information block, one of the plurality of cell beams.

In some embodiments, the cell beams are determined by the PSS, the SSS and the MIB. E.g., based on the PSS, a set of cell beams can be determined, based on the SSS, a subset of cell beams in the set of cell beams can be determined, and based on the SSS, a (e.g., second subset of) cell beam in the subset of cell beams can be determined.

For example, if there are 8 cell beams, the SFN for PSS, SSS in each cell beam are as follows:

| Cell beam1 | Cell beam2 | Cell beam3 | Cell beam4 | Cell beam5 | Cell beam6 | Cell beam7 | Cell beam8 |
|---|---|---|---|---|---|---|---|
| PSS SFN: 0 | PSS SFN: 0 | PSS SFN: 0 | PSS SFN: 0 | PSS SFN: 1 | PSS SFN: 1 | PSS SFN: 1 | PSS SFN: 1 |
| SSS SFN: 0 | SSS SFN: 0 | SSS SFN: 2 | SSS SFN: 2 | SSS SFN: 0 | SSS SFN: 0 | SSS SFN: 2 | SSS SFN: 2 |
| MIB SFN: 0 | MIB SFN: 1 | MIB SFN: 0 | MIB SFN: 1 | MIB SFN: 0 | MIB SFN: 1 | MIB SFN: 0 | MIB SFN: 1 | one cell beam, or the time interval between two polling pattern that primary synchronization signal, secondary synchronization signal and master information block transmit over all cell beams in sequence with wraparound. In some embodiments, during the time length that primary synchronization signal and secondary synchronization signal transmit continuously over one cell beam, the cell beam index is the same.

In some embodiments, the one or more common signals include a primary synchronization signal, a secondary synchronization signal, and a master information block. In some embodiments, the wireless communication device determines a reception occasion of the primary synchronization signal, a reception occasion of the secondary synchronization signal, and/or a reception occasion of the master information block based on identifying during which of a plurality of system frames, that correspond to a periodicity of the plurality of cell beams, the wireless communication device receives the primary synchronization signal, the secondary synchronization signal, and/or the master information block. In some embodiments, the wireless communication device determines, according to the determined reception occasion of the primary synchronization signal, the determined reception occasion of the secondary synchronization signal, and/or the determined reception occasion of the master information block, the index of the cell beam that the wireless communication device selects. In some embodi- Once UE detects PSS in SFN0, it can be aware that it is in Cell beam1, Cell beam2, Cell beam3, or Cell beam4, if the UE further detects SSS in SFN0, it can be decided that it is in Cell beam1 or Cell beam2, and if the UE further detects MIB in SFN0, it can be decided that it is in Cell beam1.

In some embodiments, an index or an identity of cell beam is explicitly indicated in the PBCH or MIB. Once the PBCH or MIB is detected, the UE can decide the camping cell beam based on the index or identity of cell beam included in the PBCH or MIB.

In some embodiments, a number of the plurality of cell beams is explicitly indicated by at least one of a master information block, or a system information block. In some embodiments, the one or more common signals include a physical broadcast channel, a master information block, and a system information block 1. In some embodiments, an index or an identity of the cell beam is explicitly indicated by at least one of the physical broadcast channel, the master information block, or the system information block 1. In some embodiments, the wireless communication device determines, according to the index or the identity, the index of the cell beam that the wireless communication device selects. In some embodiments, the wireless communication node explicitly indicates a number of the plurality of cell beams in at least one of a master information block or a system information block. In some embodiments, the wireless communication node explicitly indicates an index or an identity of one of the plurality of cell beams in at least one of the physical broadcast channel, the master information block, or the system information block 1, thereby causing the wireless communication device to select, according to the index or the identity, the cell beam.

In some embodiments, a periodicity of cell beams is explicitly indicated in the PBCH or MIB. Once the PSS/SSS, the PBCH, or the MIB is detected, the UE can decide the camping cell beam based on the periodicity sequence that the PSS/SSS, the PBCH or the MIB are detected.

In some embodiments, the one or more common signals include a physical broadcast channel, a master information block, and a system information block 1. In some embodiments, a periodicity of the cell beams is explicitly indicated by at least one of the physical broadcast channel, the master information block, or the system information block 1. In some embodiments, the wireless communication device determines, according to the periodicity, the index of the cell beam that the wireless communication device selects. In some embodiments, the wireless communication node explicitly indicates a periodicity of the cell beams in at least one of the physical broadcast channel, the master information block, or the system information block 1, thereby causing the wireless communication device to select, according to the periodicity, the cell beam.

Figure 6A:
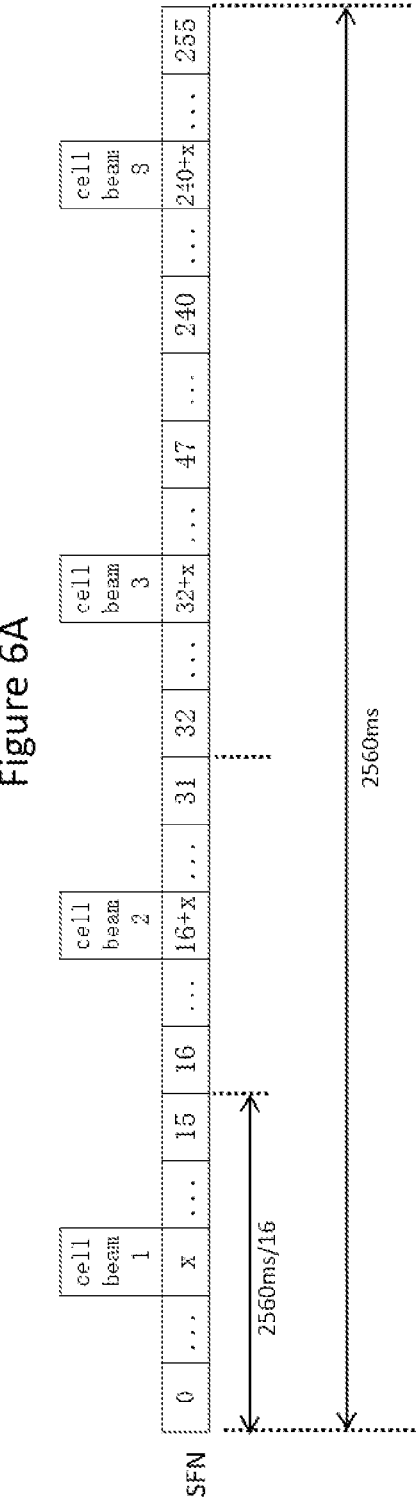
FIG. 6A is a diagram illustrating an example mapping between cell beams and system information block 1 (SIB) info, in accordance with some embodiments of the present disclosure.

FIG. 6A is a diagram illustrating an example mapping between cell beams and system information block1 (SIB1) info, in accordance with some embodiments of the present disclosure. In some embodiments, the SystemInformationBlockType1-NB (SIB1-NB) uses a fixed schedule with a periodicity of 2560 ms and the repetitions made, equally spaced, within the 2560 ms are indicated by schedulingInfoSIB1 field in the MIB-NB. The Number of SIB1 repetitions can be [4, 8, 16] and the staring SFN for SIB1 repetitions is based on the PCI and schedulingInfoSIB1. E.g., the value range of schedulingInfoSIB1 are INTEGER (0 . . . 15). The Number(j) of repetitions for NPDSCH carrying SystemInformationBlockType1-NB, FDD is determined as follows:

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The Starting radio frame (k) for the first transmission of the NPDSCH carrying SystemInformationBlockType1-NB, FDD is determined as follows:

| Number of NPDSCH repetitions | PCI | Starting radio frame number for SystemInformationBlockType1-NB repetitions ($n_f$ mod 256) |
|---|---|---|
| 4 | PCI mod 4 = 0 | 0 |
| | PCI mod 4 = 1 | 16 |
| | PCI mod 4 = 2 | 32 |
| | PCI mod 4 = 3 | 48 |

-continued

| Number of NPDSCH repetitions | PCI | Starting radio frame number for SystemInformationBlockType1-NB repetitions ($n_f$ mod 256) |
|---|---|---|
| 8 | PCI mod 2 = 0 | 0 |
| | PCI mod 2 = 1 | 16 |
| 16 | PCI mod 2 = 0 | 0 |
| | PCI mod 2 = 1 | 1 |

Thus, the cell beams can be identified by the SFN transmitting/receiving SIB in the SIB1 scheduling period (e.g., 2560 ms). E.g., in FIG. 6A, there are 8 cell beams in one cell, and the SIB1 repetition number in 2560 ms is 16. In some embodiments, the SIB1 is transmitted/received per SIB1 repetition period in SIB1 scheduling periodicity in sequence in cell beams. For example, the eNB transmits the SIB1 of cell beam 1 in the first SIB1 repetition period. If the UE receives the SIM in the first SIB1 repetition period, it can be aware that it is in cell beam 1. The eNB transmits of cell beam 2 in the second SIB1 repetition period. If the UE receives the SIM in the second SIB1 repetition period, it can be aware that it is in cell beam 2. The eNB transmits the SIB1 of cell beam 3 in the third SIM repetition period. If the UE receives SIB1 in the third SIB1 repetition period, it can be aware that it is in cell beam 3, and so on.

In some embodiments, if the UE receives the NPSS/NSSS/MIB/SIB1 of multiple cell beams, the wireless communication device selects the cell beam based on at least one of: the cell beam having a strongest radio quality value in the plurality of cell beams, or the cell beam having a radio quality value above a predefined radio quality threshold. The radio quality includes at least one of: a Reference Signal Received Power (RSRP), a Reference Signal Received Quality (RSRQ), or a Reference Signal-Signal to Noise and Interference Ratio (RS-SINR). The pre-defined radio quality threshold is at least one of: provided by the wireless communication node in a system information block, or pre-defined.

In some embodiments, if there are m number of cell beams in one cell, the number of NPDSCH repetitions for SIB1 is j, then the SFN for SIB1 of cell beam i fulfills one of the following conditions:

$$\text{Floor}((\text{SFN mod } 256)/j)\text{mod } m+1=i,$$

$$\text{Floor}(\text{SFN}/j)\text{mod } m+1=i, \text{ or}$$

SFN=256*k+Starting radio frame number for SystemInformationBlockType1-NB repetitions(the value from the upper table)+(256/j)*(j/m*K+i−1), wherein K is a non-negative integer and m*K is less than j.

In some embodiments, the one or more common signals include a system information block 1. In some embodiments, the wireless communication device determines a reception occasion of the system information block 1 based on identifying during which of a plurality of system frames the wireless communication device receives the system information block 1. In some embodiments, the wireless communication device determines, according to the determined reception occasion, the index of the cell beam that the wireless communication device selects. In some embodiments, the wireless communication node determines a transmission occasion of the system information block 1 based on during which of a plurality of system frames the wireless communication node transmits the system information block 1, thereby causing the wireless communication device to select, according to the determined transmission occasion, one of the plurality of cell beams.

Figure 6B:
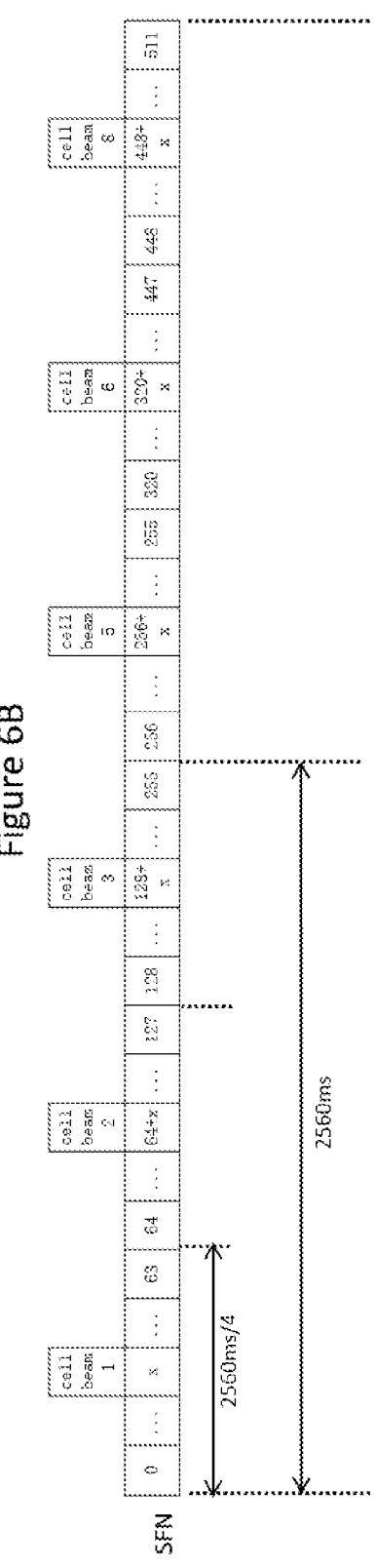
FIG. 6B is a diagram illustrating an example mapping between cell beams and SIB1 info, in accordance with some embodiments of the present disclosure.

FIG. 6B is a diagram illustrating an example mapping between cell beams and SIB info, in accordance with some embodiments of the present disclosure. In some embodiments, the number of cell beams is larger than the Number(j) of repetitions for narrowband PDSCH (NPDSCH) carrying SystemInformationBlockType1-NB in one SIB1 scheduling periodicity (e.g., 2560 ms), the cell beams can be identified by the SFN transmitting/receiving SIB1 in the SFN period (e.g., 10240 ms).

As shown in FIG. 6B, there are 8 cell beams in one cell, and the SIB1 repetition number in 2560 ms is 4. In some embodiments, the SIB1 is transmitted/received per SIB1 repetition period in SFN periodicity (10240 ms) in sequence for cell beams. For example, the eNB transmits SIB1 of cell beam 1 in the first SIB1 repetition period. If the UE receives the SIB1 in the first SIB1 repetition period, it can be aware that it is in cell beam 1. The eNB transmits of cell beam 2 in the second SIB1 repetition period. If the UE receives the SIB1 in the second SIB1 repetition period, it can be aware that it is in cell beam 2. The eNB transmits the SIB1 of cell beam 3 in the third SIB1 repetition period. If the UE receives the SIB1 in the third SIB1 repetition period, it can be aware that it is in the cell beam 3, and so on. In some embodiments, if there are m number of cell beams in one cell, the Number of NPDSCH repetitions for SIB1 is j, then the SFN for SIB1 of cell beam i fulfills the following condition:

$$\text{Floor}(SFN/j)\bmod m+1=i, \text{ or}$$

SFN=Starting radio frame number for SystemInformationBlockType1-NB repetitions(the value from the upper table)+$(256/j)*(4*j*K/m+i-1)$, wherein K is a non-negative integer and $4*j*K$ is larger than m.

In some embodiments, the NPSS/NSSS/MIB/SIB1 are all transmitted/received in the SIB1 repetition period in sequence for cell beams. E.g., the eNB transmits the NPSS/NSSS/MIB/SIB1 of cell beam 1 in the first SIB1 repetition period. If the UE receives at least one of the NPSS, the NSSS, the MIB, or the SIB1 in the first SIB1 repetition period, it can be aware that it is in cell beam 1. The eNB transmits the NPSS/NSSS/MIB/SIB1 of cell beam 2 in the second SIB1 repetition period. If the UE receives at least one of the NPSS, the NSSS, the MIB, or the SIB1 in the second SIB1 repetition period, it can be aware that it is in cell beam 2. The eNB transmits the NPSS/NSSS/MIB/SIB1 of cell beam 3 in the third SIB1 repetition period. If the UE receives at least one of the NPSS, the NSSS, the MIB, or the SIB1 in the third SIB1 repetition period, it can be aware that it is in cell beam 3 and so on. In some embodiments, the periodicity of cell beams can be the time length that primary synchronization signal, secondary synchronization signal, master information block and system information block 1 transmit continuously over one cell beam, or the time interval between two polling pattern that primary synchronization signal, secondary synchronization signal, master information block and system information block 1 transmit over all cell beams in sequence with wraparound. In some embodiments, during the time length that primary synchronization signal and secondary synchronization signal transmit continuously over one cell beam, the cell beam index is the same.

In some embodiments, one or more common signals include a primary synchronization signal, a secondary synchronization signal, a master information block, and a system information block 1. In some embodiments, the wireless communication device determines a reception occasion of the primary synchronization signal, a reception occasion of the secondary synchronization signal, a reception of the master information block, and/or a reception of the system information block 1 based on identifying during which of a plurality of system frames, that correspond to a periodicity of the plurality of cell beams, the wireless communication device receives the primary synchronization signal, the secondary synchronization signal, the master information block, and/or the system information block 1. In some embodiments, the wireless communication device determines, according to the determined reception occasion of the primary synchronization signal, the determined reception occasion of the secondary synchronization signal, the determined reception occasion of the master information block, and/or the determined reception occasion of the system information block 1, the index of the cell beam that the wireless communication device selects. In some embodiments, the periodicity of the cell beams includes one or more of a scheduling period of the system information block 1, or one or more of a repetition period of the system information block 1, which are at least one of: provided by the wireless communication node in a physical broadcast channel, provided by the wireless communication node in the master information block, provided by the wireless communication node in a system information block, or predefined. In some embodiments, the wireless communication node determines a transmission occasion of the primary synchronization signal, a transmission occasion of the secondary synchronization signal, a transmission occasion of the master information block, and/or a transmission of the system information block 1 based on during which of a plurality of system frames, that correspond to a periodicity of receptions of the system information block, the wireless communication node transmits the primary synchronization signal, the secondary synchronization signal, the master information block, and/or the system information block, thereby causing the wireless communication device to select, according to the determined transmission occasion of the primary synchronization signal, the determined reception occasion of the secondary synchronization signal, the determined transmission occasion of the master information block, and/or the determined transmission occasion of the system information block, one of the plurality of cell beams.

In some embodiments, if the number of cell beams is larger than the Number(j) of repetitions for NPDSCH carrying SystemInformationBlockType1-NB in one SFN periodicity (e.g., 10240 ms), the cell beams can be identified by the SFN transmitting/receiving SIB in the hyper-SFN (H-SFN) period (e.g., $\times*10240$ ms, $\times=1 \ldots 1024$). E.g., the SIB1 is transmitted/received per SIB1 repetition period in H-SFN periodicity ($1024*10240$ ms) in sequence in cell beams. For example, the eNB transmits the SIB1 of cell beam 1 in the first SIB1 repetition period. If the UE receives the SIB1 in the first SIB1 repetition period, it can be aware that it is in the cell beam 1. The eNB transmits the SIB1 of cell beam 2 in the second SIB1 repetition period. If the UE receives SIB1 in the second SIB1 repetition period, it can be aware that it is in the cell beam 2. The eNB transmits the SIB1 of cell beam 3 in the third SIB1 repetition period. If the UE receives the SIB1 in the third SIB1 repetition period, it can be aware that it is in the cell beam 3, and so on. In some embodiments, if there are m number of cell beams in one cell, the number of NPDSCH repetitions for SIB1 is j, then the SFN for SIB1 of cell beam i fulfills the following condition:

$$\text{Floor}((H\text{-}SFN*1024+SFN)/j)\bmod m+1=i.$$

Figure 6C:
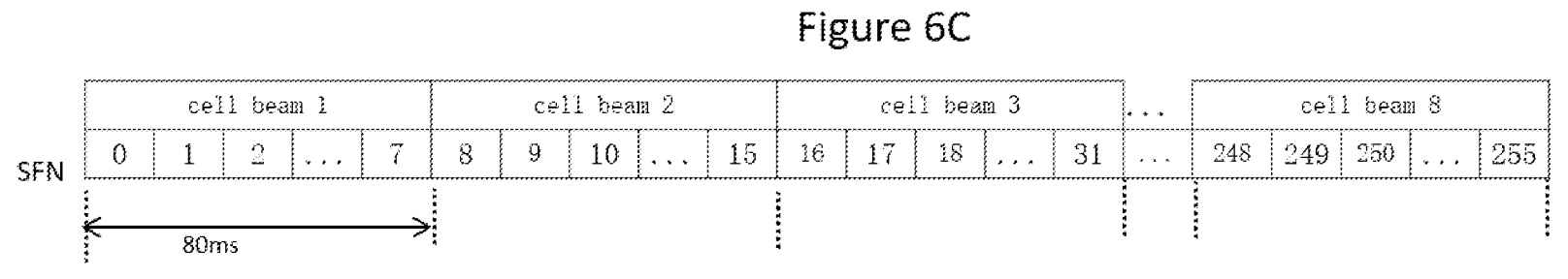

FIG. 6C is a diagram illustrating an example mapping between cell beams and SIB info, in accordance with some embodiments of the present disclosure. In some embodiments, the method mapping from SIB1 to cell beams can be used for eMTC. E.g., for the FDD eMTC, the SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0. For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR uses a schedule with a periodicity of 80 ms. A transport block size (TBS) for SystemInformationBlockType1-BR and the repetitions (j) made within 80 ms are indicated via scheduling-InfoSIB1-BR in MIB or, optionally, in the RRCConnection-Reconfiguration message including the MobilityControlInfo. The value range of schedulingInfo-SIB1-BR is INTEGER (0 . . . 31). The Number of repetitions for PDSCH carrying SystemInformationBlockType1-BR for BL/CE UE is as follows:

| Value of schedulingInfoSIB1-BR | Number of PDSCH repetitions$^{(j)}$ |
| --- | --- |
| 0 | N/A |
| 1 | 4 |
| 2 | 8 |
| 3 | 16 |
| 4 | 4 |
| 5 | 8 |
| 6 | 16 |
| 7 | 4 |
| 8 | 8 |
| 9 | 16 |
| 10 | 4 |
| 11 | 8 |
| 12 | 16 |
| 13 | 4 |
| 14 | 8 |
| 15 | 16 |
| 16 | 4 |
| 17 | 8 |
| 18 | 16 |
| 19-31 | Reserved |

Thus, the cell beams can be identified by the SFN transmitting/receiving SIB1.

As shown in FIG. 6C, there are 8 cell beams in one cell, and the SIB1 is transmitted/received with in the SIB1 scheduling periodicity in sequence for cell beams. E.g., the eNB transmits the SIB1 of cell beam 1 in the first MIB. If the UE receives the SIB1 in the first SIB1 scheduling periodicity, it can be aware that it is in cell beam 1. The eNB transmits the SIB1 of cell beam 2 in the second SIB1 scheduling periodicity. If the UE receives the SIB1 in the second SIB1 scheduling periodicity, it can be aware that it is in cell beam 2. The eNB transmits SIB1 of cell beam 3 in the third SIB1 scheduling periodicity. If the UE receives the SIB1 in the third SIB1 scheduling periodicity, it can be aware that it is in cell beam 3, and so on. In some embodiments, if there are m number of cell beams in one cell, then the SFN for SIB1 of cell beam i fulfills the following condition:

$$\text{Floor}(SFN/8)\bmod m+1=i.$$

Figure 6D:
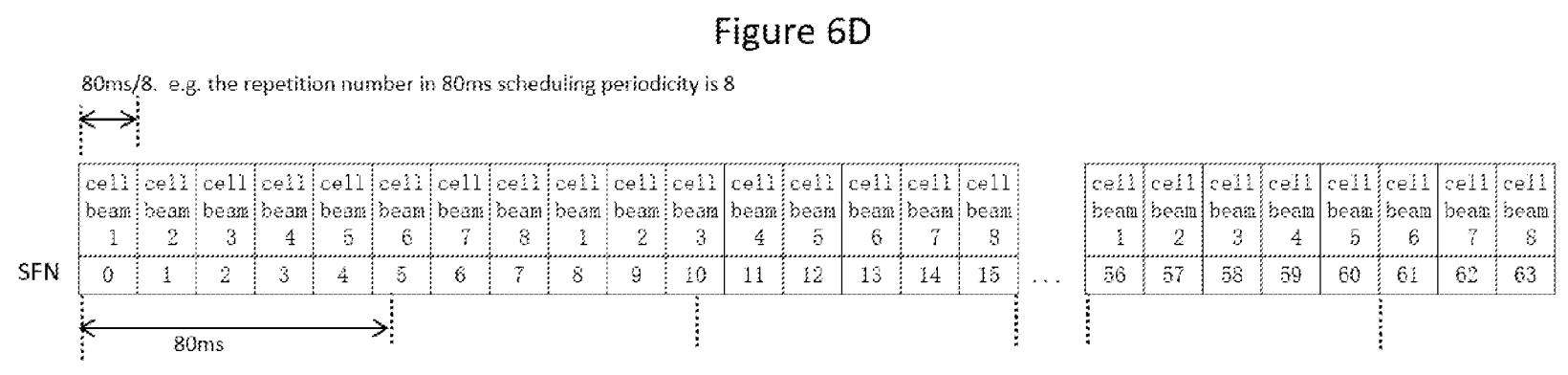

FIG. 6D is a diagram illustrating an example mapping between cell beams and SIB info, in accordance with some embodiments of the present disclosure. In some embodiments, the method mapping can be used for eMTC. As shown in FIG. 6D, there are 8 cell beams in one cell, and the SIB1 is transmitted/received with in the SIB1 repetition periodicity in sequence for cell beams. E.g., the eNB transmits the SIB1 of cell beam 1 in the first SIB1 repetition periodicity. If the UE receives the SIB1 in the first SIB1 repetition periodicity, it can be aware that it is in cell beam 1. The eNB transmits the SIB1 of cell beam 2 in the second SIB1 repetition periodicity. If the UE receives the SIB1 in the second SIB1 repetition periodicity, it can be aware that it is in cell beam 2. The eNB transmits SIB1 of cell beam 3 in the third SIB1 repetition periodicity. If the UE receives SIB1 in the third SIB1 repetition periodicity, it can be aware that it is in cell beam 3, and so on. In some embodiments, if there are m number of cell beams in one cell, then the SFN for SIB1 of cell beam i fulfills the following condition, if j=8:

$$\text{Mod}(SFN,8)\bmod m+1=i.$$

If there are m number of cell beams in one cell, then the subframe and SFN for SIB1 of cell beam i fulfills the following condition, if j=4:

$$\text{Mod}(SFN,2)=0 \text{ and } \text{Mod}(SFN,8)\bmod m+1=i.$$

If there are m number of cell beams in one cell, then the subframe and SFN for SIB1 of cell beam i fulfills the following condition, if j=16:

$$\text{Mod}(SFN,8)\bmod m+1=\text{floor}(i/2).$$

In some embodiments, the cell beams are determined by the PSS, the SSS, the MIB and the SIB1. E.g., based on the PSS, a set 1 of cell beams can be determined, based on the SSS, a subset 1-1 of cell beams in the set 1 of cell beams can be determined, based on the MIB, an subset 1-1-1 in the subset 1-1 of cell beams can be determined, and based on the SIB, the cell beam in the subset 1-1-1-1 in the subset 1-1-1 of cell beams can be determined.

For example, if there are 16 cell beams, the SFN for PSS, SSS in each cell beam are as follows:

| Cell beam 1 | Cell beam 2 | Cell beam 3 | Cell beam 4 | Cell beam 5 | Cell beam 6 | Cell beam 7 | Cell beam 8 | Cell beam 9 | Cell beam 10 | Cell beam 11 | Cell beam 12 | Cell beam 13 | Cell beam 14 | Cell beam 15 | Cell beam 16 |
| --- | --- | --- | --- | --- | --- | --- | --- | --- | --- | --- | --- | --- | --- | --- | --- |
| PSS SFN: 0 | PSS SFN: 0 | PSS SFN: 0 | PSS SFN: 0 | PSS SFN: 0 | PSS SFN: 0 | PSS SFN: 0 | PSS SFN: 0 | PSS SFN: 1 | PSS SFN: 1 | PSS SFN: 1 | PSS SFN: 1 | PSS SFN: 1 | PSS SFN: 1 | PSS SFN: 1 | PSS SFN: 1 |
| SSS SFN: | SSS SFN: | SSS SFN: | SSS SFN: | SSS SFN: | SSS SFN: | SSS SFN: | SSS SFN: | SSS SFN: | SSS SFN: | SSS SFN: | SSS SFN: | SSS SFN: | SSS SFN: | SSS SFN: | SSS SFN: |

-continued

| Cell beam 1 | Cell beam 2 | Cell beam 3 | Cell beam 4 | Cell beam 5 | Cell beam 6 | Cell beam 7 | Cell beam 8 | Cell beam 9 | Cell beam 10 | Cell beam 11 | Cell beam 12 | Cell beam 13 | Cell beam 14 | Cell beam 15 | Cell beam 16 |
|---|---|---|---|---|---|---|---|---|---|---|---|---|---|---|---|
| 0 | 0 | 0 | 0 | 1 | 1 | 1 | 1 | 0 | 0 | 0 | 0 | 1 | 1 | 1 | 1 |
| MIB SFN: 0 | MIB SFN: 0 | MIB SFN: 1 | MIB SFN: 1 | MIB SFN: 0 | MIB SFN: 0 | MIB SFN: 1 | MIB SFN: 1 | MIB SFN: 0 | MIB SFN: 0 | MIB SFN: 1 | MIB SFN: 1 | MIB SFN: 0 | MIB SFN: 0 | MIB SFN: 1 | MIB SFN: 1 |
| SIB1 SFN: 0 | SIB1 SFN: 1 | SIB1 SFN: 0 | SIB1 SFN: 1 | SIB1 SFN: 0 | SIB1 SFN: 1 | SIB1 SFN: 0 | SIB1 SFN: 1 | SIB1 SFN: 0 | SIB1 SFN: 1 | SIB1 SFN: 0 | SIB1 SFN: 1 | SIB1 SFN: 0 | SIB1 SFN: 1 | SIB1 SFN: 0 | SIB1 SFN: 1 |

Once UE detects PSS in SFN0, it can be aware that it is in Cell beam1, Cell beam2, Cell beam3, Cell beam4, Cell beam5, Cell beam6, Cell beam8 or Cell beam8. If the UE further detects SSS in SFN0, it can be decided that it is in Cell beam1, Cell beam2, Cell beam3, or Cell beam4. If the UE further detects MIB in SFN0, it can be decided that it is in Cell beam1 or cell beam 2. If the UE further detects SIB1 in SFN0, it can be finally decided that it is in Cell beam1.

In some embodiments, an index or an identity of cell beam is explicitly indicated in SIB1. Once SIB1 is detected, UE can decide the camping cell beam based on the index or identity of cell beam included in SIB1. In some embodiments, a periodicity of cell beams is explicitly indicated in SIB1. Once PSS/SSS, PBCH/MIB or SIB1 is detected, UE can decide the camping cell beam based on the periodicity sequence that PSS/SSS, PBCH, MIB or SIB1 are detected.

Figure 7:
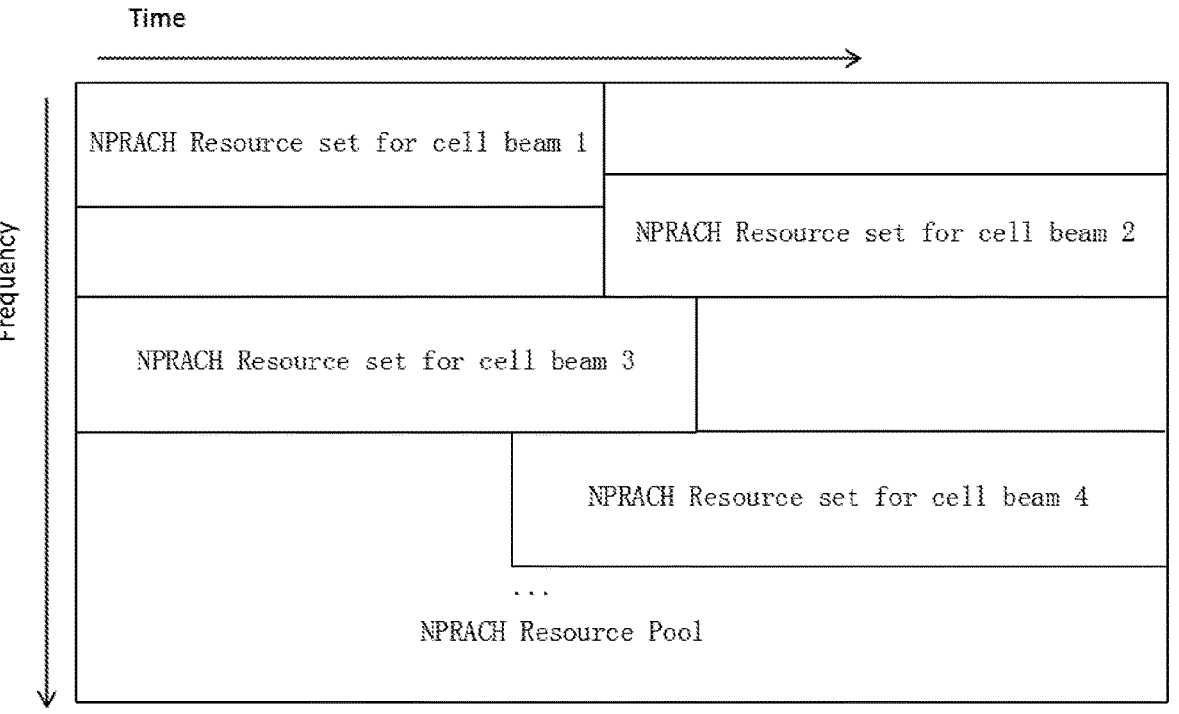
FIG. 7 is a diagram illustrating an example mapping between cell beams and narrowband physical random access channel (NPRACH) resources, in accordance with some embodiments of the present disclosure.

FIG. 7 is a diagram illustrating an example mapping between cell beams and narrowband physical random access channel (NPRACH) resources, in accordance with some embodiments of the present disclosure. FIG. 7 shows the NPRACH resource configuration per cell beam. In some embodiments, different cell beams have different NPRACH resources (e.g., the time and/or frequency configuration of the preamble/PDCCH is different for different cell beams in one cell). Thus, eNB can be aware which cell beam the UE is in based on the NPRACH resource (e.g. preamble) the UE selects and use.

E.g., the UE decides the camped cell beam based on at least one of a SFN carrying NPSS (FIGS. 4A-4E), SFN carrying NSSS (FIGS. 4A-4E), SFN carrying MIB (FIGS. 5A-5E), SFN carrying SIB1 (FIGS. 6A-6D). The UE selects the NPRACH resource of the selected cell beam, and transmits the NPRACH preamble in the selected cell beam. The eNB can be aware the cell beam that the UE selected based on the preamble UE sent, and scheduling the radio resource in the cell beam that the UE selected. The number of cell beams in one cell can be indicated explicitly (e.g., with an explicit indication in MIB or SIB1), or be indicated implicitly (e.g., in SIB2 based on PRACH resource set number, one PRACH resource set corresponding to one cell beam).

In some embodiments, the one or more common signals include a physical broadcast channel, and wherein respective different scrambling codes of physical broadcast channel are used for the plurality of cell beams. In some embodiments, the wireless communication device determines, according to one of the scrambling codes of the physical broadcast channel, the index of the cell beam that the wireless communication device selects. In some embodiments, a number of the plurality of cell beams is implicitly indicated in a system information block by a number of physical random access channel resource sets. In some embodiments, the wireless communication device selects a physical random access channel resource corresponding to the selected cell beam. In some embodiments, the wireless communication device transmits, to the wireless communication node, a preamble using the selected physical random access channel resource.

FIG. 8 is a flowchart diagram illustrating a method 800 for determining a cell beam, in accordance with some embodiments of the present disclosure. Referring to FIGS. 1-7, the method 800 can be performed by a wireless communication device (e.g., a UE, the UE 104), in some embodiments. Additional, fewer, or different operations may be performed in the method 800 depending on the embodiment.

A wireless communication device receives, from a wireless communication node, a plurality of common signals, wherein the wireless communication node provides a plurality of cell beams (802). The wireless communication device determines, based on respective reception occasions of one or more of the plurality of common signals, an index of one of a plurality of cell beams that the wireless communication device selects (804).

Figure 9:
FIG. 9 is a flowchart diagram illustrating a method for transmitting common signals, in accordance with some embodiments of the present disclosure.
Figure 9:
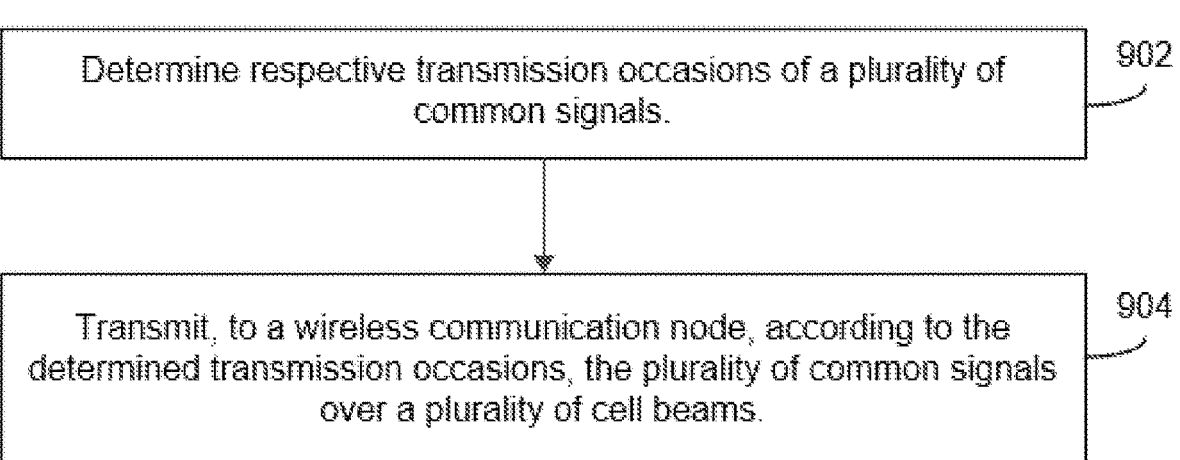

FIG. 9 is a flowchart diagram illustrating a method 900 for transmitting common signals, in accordance with some embodiments of the present disclosure. Referring to FIGS. 1-7, the method 900 can be performed by a wireless communication node (e.g., an eNB, the BS 102), in some embodiments. Additional, fewer, or different operations may be performed in the method 900 depending on the embodiment.

A wireless communication node determines respective transmission occasions of a plurality of common signals (902). The wireless communication node transmits, to a wireless communication device, according to the determined transmission occasions, the plurality of common signals over a plurality of cell beams (904).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:

receiving, by a wireless communication device from a wireless communication node, a plurality of common signals, wherein the wireless communication node provides a plurality of cell beams, the plurality of common signals including a primary synchronization signal and/ or a secondary synchronization signal, wherein the wireless communication device receives respective common signals of each cell beam, of the plurality of common signals for the plurality of cell beams, in respective system frame numbers of a plurality of system frame numbers, each cell beam mapped to a respective system frame number of the plurality of system frame numbers;

selecting, by the wireless communication device, based on respective reception occasions corresponding to a number of receptions of one or more of the plurality of common signals, a cell beam of the plurality of cell beams, the cell beam selected based on a respective radio signal metric among received common signals; and determining, by the wireless communication device, an index of the cell beam selected by the wireless communication device, based on the respective system frame numbers in which the common signals are received.

2. The wireless communication method of claim 1, wherein the plurality of common signals further include at least one of: a physical broadcast channel signal, a master information block, or a system information block 1.

3. The wireless communication method of claim 1, the method further comprising:

determining, by the wireless communication device, a reception occasion of the primary synchronization signal and/or a reception occasion of the secondary synchronization signal based on an identification of during which of a plurality of system frames the wireless communication device receives the primary synchronization signal and/or the secondary synchronization signal, wherein the identification corresponds to a periodicity of reception of the primary synchronization signal and/or the secondary synchronization signal on the cell beams in time domain; and determining, by the wireless communication device, according to the determined reception occasion of the primary synchronization signal and/or the determined reception occasion of the secondary synchronization signal, the index of the cell beam that the wireless communication device selects.

4. The wireless communication method of claim 3, further comprising determining the reception occasion of the primary synchronization signal and/or the reception occasion of the secondary synchronization signal further based on identifying a number of repetitive receptions of the primary synchronization signal and/or a number of repetitive receptions of the secondary synchronization signal for each of the plurality of cell beams.

5. The wireless communication method of claim 3, further comprising determining the reception occasion of only the primary synchronization signal further based on identifying a number of repetitive receptions of the primary synchronization signal for each of the plurality of cell beams.

6. The wireless communication method of claim 3, further comprising determining the reception occasion of only the secondary synchronization signal further based on identifying a number of repetitive receptions of the secondary synchronization signal for each of the plurality of cell beams.

7. The wireless communication method of claim 1, wherein the method further comprises:

determining, by the wireless communication device, a reception occasion of the primary synchronization signal and/or a reception occasion of the secondary synchronization signal based on an identification of during which of a plurality of system frames the wireless communication device receives the primary synchronization signal and/or the secondary synchronization signal, wherein the identification corresponds to a periodicity of reception of the primary synchronization signal, the secondary synchronization signal, and/or a master information block on the cell beams in time domain; and determining, by the wireless communication device, according to the determined reception occasion of the primary synchronization signal and/or the determined reception occasion of the secondary synchronization signal, the index of the cell beam that the wireless communication device selects.

8. The wireless communication method of claim 7, wherein the periodicity of the cell beam includes one or more of a periodicity of reception of the secondary synchronization signal, which are at least one of: provided by the wireless communication node in a physical broadcast channel, provided by the wireless communication node in a master information block, provided by the wireless communication node in a system information block, or predefined time length.

9. The wireless communication method of claim 1, wherein the one or more common signals include a master information block, the method further comprises:

determining, by the wireless communication device, a reception occasion of the master information block based on identifying during which of a plurality of system frames the wireless communication device receives the master information block via a physical broadcast channel (PBCH); and determining, by the wireless communication device, according to the determined reception occasion, the index of cell beam that the wireless communication device selects.

10. The wireless communication method of claim 1, wherein the one or more common signals further include a master information block, the method further comprises:

determining, by the wireless communication device, a reception occasion of the primary synchronization signal, a reception occasion of the secondary synchronization signal, and/or a reception occasion of the master information block based on identifying during which of a plurality of system frames, that correspond to a periodicity of the plurality of cell beams, the wireless communication device receives the primary synchronization signal, the secondary synchronization signal, and/or the master information block; and determining, by the wireless communication device, according to the determined reception occasion of the primary synchronization signal, the determined reception occasion of the secondary synchronization signal, and/or the determined reception occasion of the master information block, the index of the cell beam that the wireless communication device selects.

11. The wireless communication method of claim 10, wherein the periodicity of the cell beam includes one or more of a scheduling period of the master information block, or one or more of a repetition period of the master information block, which are at least one of: provided by the wireless communication node in a physical broadcast channel, provided by the wireless communication node in the master information block, provided by the wireless communication node in a system information block, or a predefined.

12. The wireless communication method of claim 1, wherein the one or more common signals include a system information block 1, the method further comprises:

determining, by the wireless communication device, a reception occasion of the system information block 1 based on identifying during which of a plurality of system frames the wireless communication device receives the system information block 1; and determining, by the wireless communication device, according to the determined reception occasion, the index of the cell beam that the wireless communication device selects.

13. The wireless communication method of claim 1, wherein the one or more common signals further include a master information block and a system information block 1, the method further comprises:

determining, by the wireless communication device, a reception occasion of the primary synchronization signal, a reception occasion of the secondary synchronization signal, a reception occasion of the master information block, and/or a reception of the system information block 1 based on identifying during which of a plurality of system frames, that correspond to a periodicity of the plurality of cell beams, the wireless communication device receives the primary synchronization signal, the secondary synchronization signal, the master information block, and/or the system information block 1; and determining, by the wireless communication device, according to the determined reception occasion of the primary synchronization signal, the determined reception occasion of the secondary synchronization signal, the determined reception occasion of the master information block, and/or the determined reception occasion of the system information block 1, the index of the cell beam that the wireless communication device selects.

14. The wireless communication method of claim 13, wherein the periodicity of the cell beams includes one or more of a scheduling period of the system information block 1, or one or more of a repetition period of the system information block 1, which are at least one of: provided by the wireless communication node in a physical broadcast channel, provided by the wireless communication node in the master information block, provided by the wireless communication node in a system information block, or predefined.

15. The wireless communication method of claim 1, wherein a number of the plurality of cell beams is explicitly indicated by at least one of a master information block, or a system information block.

16. The wireless communication method of claim 1, wherein the one or more common signals further include a physical broadcast channel, a master information block, and a system information block 1, and wherein an index or an identity of the cell beam is explicitly indicated by at least one of the physical broadcast channel, the master information block, or the system information block 1, the method further comprises determining, by the wireless communication device, according to the index or the identity, the index of the cell beam that the wireless communication device selects; or wherein the one or more common signals include a physical broadcast channel, a master information block, and a system information block 1, and wherein a periodicity of the cell beams is explicitly indicated by at least one of the physical broadcast channel, the master information block, or the system information block 1, the method further comprises determining, by the wireless communication device, according to the periodicity, the index of the cell beam that the wireless communication device selects; or wherein the one or more common signals include a physical broadcast channel, and wherein respective different scrambling codes of physical broadcast channel are used for the plurality of cell beams, the method further comprises determining, by the wireless communication device, according to one of the scrambling codes of the physical broadcast channel, the index of the cell beam that the wireless communication device selects.

17. The wireless communication method of claim 1, wherein a number of the plurality of cell beams is implicitly indicated in a system information block by a number of physical random access channel resource sets.

18. The wireless communication method of claim 1, further comprising:

selecting, by the wireless communication device, physical random access channel resource corresponding to the selected cell beam; and transmitting, by the wireless communication device to the wireless communication node, a preamble using the selected physical random access channel resource.

19. The wireless communication method of claim 1, further comprising selecting, by the wireless communication device, the cell beam based on at least one of: the cell beam having a strongest radio quality value in the plurality of cell beams, or the cell beam having a radio quality value above a predefined radio quality threshold, wherein the radio quality includes at least one of: a Reference Signal Received Power (RSRP), a Reference Signal Received Quality (RSRQ), or a Reference Signal-Signal to Noise and Interference Ratio (RS-SINR), and wherein the pre-defined radio quality threshold is at least one of: provided by the wireless communication node in a system information block, or predefined.

20. A wireless communication device comprising:

at least one processor configured to:

receive, via a receiver from a wireless communication node, a plurality of common signals, wherein the wireless communication node provides a plurality of cell beams, the plurality of common signals including a primary synchronization signal and/or a secondary synchronization signal, wherein the wireless communication device receives respective common signals of each cell beam, of the plurality of common signals for the plurality of cell beams, in respective system frame numbers of a plurality of system frame numbers, each cell beam mapped to a respective system frame number of the plurality of system frame numbers; and determine, based on respective reception occasions of one or more of the plurality of common signals, an index of one of a plurality of cell beams that the wireless communication device selects, wherein the wireless communication device selects, based on respective reception occasions corresponding to a number of receptions of one or more of the plurality of common signals, a cell beam of the plurality of cell beams, the cell beam selected based on a respective radio signal metric among received common signals, and determines, based on the respective reception occasions of one or more of the plurality of common signals, an index of one of a plurality of cell beams that the wireless communication device selects, wherein the index is based on the respective system frame numbers in which the common signals are received.

* * * * *